US010580103B1

United States Patent
Falkenstern et al.

(10) Patent No.: US 10,580,103 B1
(45) Date of Patent: Mar. 3, 2020

(54) SIGNAL ENCODING FOR DIFFICULT ENVIRONMENTS

(71) Applicant: Digimarc Corporation, Beaverton, OR (US)

(72) Inventors: Kristyn R. Falkenstern, Portland, OR (US); Alastair M. Reed, Lake Oswego, OR (US); Stephen A. Lauer, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/851,143

(22) Filed: Dec. 21, 2017

Related U.S. Application Data

(63) Continuation-in-part of application No. 15/418,364, filed on Jan. 27, 2017, now Pat. No. 10,255,649, and (Continued)

(51) Int. Cl.
 *G06K 9/00* (2006.01)
 *G06T 1/00* (2006.01)
 *H04N 1/32* (2006.01)

(52) U.S. Cl.
 CPC .......... *G06T 1/005* (2013.01); *H04N 1/3232* (2013.01); *H04N 1/32309* (2013.01)

(58) Field of Classification Search
 CPC .................... G06T 1/0021; H04N 1/32336
 See application file for complete search history.

(56) References Cited

U.S. PATENT DOCUMENTS 5,862,260 A  1/1999 Rhoads
6,345,104 B1  2/2002 Rhoads
(Continued)

FOREIGN PATENT DOCUMENTS

WO  2016025631 A1  2/2016
WO  2018034996     2/2018

OTHER PUBLICATIONS

U.S. Appl. No. 15/261,005, filed Sep. 9, 2016. (88 pages).
(Continued)

*Primary Examiner* — Duy M Dang
(74) *Attorney, Agent, or Firm* — Digimarc Corporation

(57) ABSTRACT

This disclosure relates to advanced image signal processing technology including encoded signals and digital watermarking. One implementation is directed to a method comprising: obtaining data representing a color area; determining that the data representing the color area, or information obtained by using the data representing the color area, indicates that the color area comprises a reflectivity of 15 percent (%) or less at or around 660 nm; generating an encoded signal, the encoded signal comprising a pattern including signal elements at various spatial locations corresponding to the color area; generating holes in the color area according to the pattern, said generating holes yield an encoded color area; and selecting a fill color for placement within the holes of the encoded color area, said selecting utilizing an encoded signal error that is associated with the color area, the fill color, and a reflectance difference at or around 660 nm between the color area and the fill color, said selecting also utilizing a color error that is associated with the color area, the fill color, and the reflectance difference. Of course, other implementations, methods, packages, systems and apparatus are described in this patent document.

21 Claims, 22 Drawing Sheets
(14 of 22 Drawing Sheet(s) Filed in Color)

Related U.S. Application Data a continuation-in-part of application No. 15/261,005, filed on Sep. 9, 2016, now Pat. No. 10,304,149.

(60) Provisional application No. 62/438,886, filed on Dec. 23, 2016, provisional application No. 62/430,297, filed on Dec. 5, 2016, provisional application No. 62/377,419, filed on Aug. 19, 2016, provisional application No. 62/375,418, filed on Aug. 15, 2016.

(56) References Cited

U.S. PATENT DOCUMENTS

| | | | |
|---|---|---|---|
| 6,614,914 | B1 | 9/2003 | Rhoads |
| 6,625,297 | B1 | 9/2003 | Bradley |
| 6,674,876 | B1 | 1/2004 | Hannigan |
| 6,988,202 | B1 | 1/2006 | Rhoads |
| 6,993,149 | B2 | 1/2006 | Brunk |
| 6,993,152 | B2 | 1/2006 | Patterson |
| 7,054,461 | B2 | 5/2006 | Zeller |
| 7,072,490 | B2 | 7/2006 | Stach |
| 7,076,082 | B2 | 7/2006 | Sharma |
| 7,152,021 | B2 | 12/2006 | Alattar |
| 7,286,685 | B2 | 10/2007 | Brunk |
| 7,340,076 | B2 | 3/2008 | Stach |
| 7,352,878 | B2 | 4/2008 | Reed |
| 7,412,072 | B2 | 8/2008 | Sharma |
| 7,986,807 | B2 | 7/2011 | Stach |
| 9,117,268 | B2 | 8/2015 | Reed |
| 9,129,277 | B2 | 9/2015 | MacIntosh |
| 9,182,778 | B2 | 11/2015 | Sharma |
| 9,311,640 | B2 | 4/2016 | Filler |
| 9,380,186 | B2 | 6/2016 | Reed |
| 9,396,509 | B1 | 7/2016 | Reed |
| 9,401,001 | B2 | 7/2016 | Reed |
| 9,449,357 | B1 | 9/2016 | Lyons |
| 9,521,291 | B2 | 12/2016 | Holub |
| 9,565,335 | B2 | 2/2017 | Reed |
| 9,593,982 | B2 | 3/2017 | Rhoads |
| 9,621,760 | B2 | 4/2017 | Rhoads |
| 9,635,378 | B2 | 4/2017 | Holub |
| 9,710,871 | B2 | 7/2017 | Lyons |
| 9,747,656 | B2 | 8/2017 | Stach |
| 9,754,341 | B2 | 9/2017 | Falkenstern |
| 9,819,950 | B2 | 11/2017 | Boles |
| 9,864,919 | B2 | 1/2018 | Reed |
| 9,922,220 | B2 | 3/2018 | Evans |
| 10,255,649 | B2 | 4/2019 | Falkenstern |
| 2006/0165311 | A1 | 7/2006 | Watson |
| 2010/0150434 | A1 | 6/2010 | Reed |
| 2012/0078989 | A1 | 3/2012 | Sharma |
| 2013/0329006 | A1 | 12/2013 | Boles |
| 2015/0030201 | A1 | 1/2015 | Holub |
| 2015/0156369 | A1 | 6/2015 | Reed |
| 2015/0187039 | A1 | 7/2015 | Reed |
| 2016/0037017 | A1 | 2/2016 | Morovic |
| 2016/0064623 | A1 | 3/2016 | Clatterbuck |
| 2016/0217547 | A1 | 7/2016 | Stach |
| 2016/0275326 | A1 | 9/2016 | Falkenstern |
| 2016/0275639 | A1 | 9/2016 | Holub |
| 2016/0316098 | A1 | 10/2016 | Reed |
| 2017/0004597 | A1 | 1/2017 | Boles |
| 2017/0024840 | A1 | 1/2017 | Holub |
| 2017/0230533 | A1 | 8/2017 | Holub |
| 2017/0331976 | A1 | 11/2017 | Bai |
| 2018/0047126 | A1 | 2/2018 | Falkenstern |
| 2018/0047127 | A1 | 2/2018 | Falkenstern |

OTHER PUBLICATIONS

L. van Nes and M.A. Bouman, 'Spatial modulation transfer in the human eye', Journal of Optical Society of America, 57(3):401-406, Mar. 1967. (6 pages).

G.J. van der Horst and M.A. Bouman, 'Spatiotemporal chromaticity discrimination', Journal of Optical Society of America, 59, 1969. (7 pages).

U.S. Appl. No. 15/418,364, filed Jan 27, 2017. (72 pages).

Reed, et al., "Watermarking Spot Colors in Packaging," 2015 IS&T/SPIE Electronic Imaging conference: Media Watermarking, Security, and Forensics, San Francisco, CA Feb. 8, 2015, vol. 9409. (14 pages).

Mark S. Drew et al, "Sensor Transforms to Improve Metamerism-Based Watermarking", Color Imaging Conference, San Antonio, Nov. 2010. (5 pages).

International Search Report and Written Opinion of the International Search Authority, both dated Feb. 23, 2018, and each from assignee's PCT/US2017/046639, published as WO2018034996. (15 pages).

Reed Alastair et al, "Watermarking spot colors in packaging," Media Watermarking, Security and Forensics 2015, Proceedings of SPIE, vol. 9409, 9409064 Mar. 2015. (13 pages).

Demand Under Article 31 of the Patent Cooperation Treaty (PCT), including filing receipt, amended claims (clean and marked-up), fee sheet, and attorney response letter; al from assignee's PCT/US2017/046639, published as WO2018034996. (17 pages).

G.J. van der Horst and M.A. Bouman, 'Spatiotemporal chromaticity discrimination', Journal of Optical Society of America, 59, 1969.

L. van Nes and M.A. Bouman, 'Spatial modulation transfer in the human eye', Journal of Optical Society of America, 57(3):401-406, Mar. 1967.

Mark S. Drew et al, "Sensor Transforms to Improve Metamerism-Based Watermarking", Color Imaging Conference, San Antonio, Nov. 2010.

PCT Application No. PCT/US17/46639, filed Aug. 11, 2017.

Reed, et al., "Watermarking Spot Colors in Packaging," 2015 IS&T/SPIE Electronic Imaging conference: Media Watermarking, Security, and Forensics, San Francisco, CA Feb. 8, 2015, vol. 9409.

U.S. Appl. No. 15/261,005, filed Sep. 9, 2016.

U.S. Appl. No. 15/418,364, filed Jan. 27, 2017.

Jan. 11, 2019 Non-final Office Action, dated Apr. 19, 2019 Amendment, dated May 7, 2019 Notice of Allowance, all from assignee's U.S. Appl. No. 16/119,410. (22 pages).

Jun. 24, 2019 Notice of Allowance, dated Apr. 19, 2019 Amendment, dated Jan. 2, 2019 non-final office action, and Jan. 26, 2018 Preliminary Amendment, all from assignee's U.S. Appl. No. 15/851,143. (29 pages).

U.S. Appl. No. 15/851,143, filed Dec. 21, 2017. (101 pages).

U.S. Appl. No. 16/119,410, filed Aug. 31, 2018. (111 pages).

Fig. 13                           Fig. 14
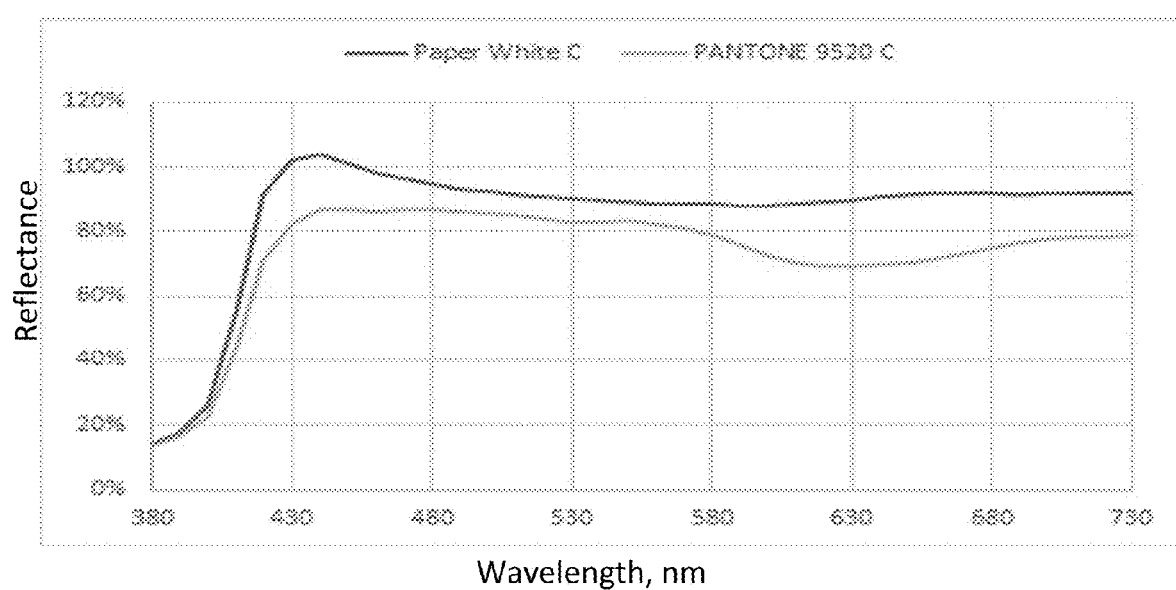
Fig. 15B

| Color Name | Δ660 | DB Score |
| --- | --- | --- |
| PANTONE 9520 | 20 | 100 |
| PANTONE 9524 | 40 | 96 |
| PANTONE Green 0921 | 50 | 92 |
| PANTONE 9540 | 19 | 91 |
| PANTONE 9500 | 34 | 88 |
| PANTONE 9541 | 21 | 88 |
| PANTONE 9521 | 26 | 87 |
| PANTONE 9502 | 28 | 84 |
| PANTONE 9522 | 26 | 84 |
| PANTONE 9523 | 24 | 83 |
| PANTONE 9460 | 14 | 82 |
| PANTONE 9501 | 38 | 82 |
| PANTONE 9482 | 32 | 82 |
| PANTONE 9040 | 18 | 81 |
| PANTONE 9481 | 34 | 81 |
| PANTONE 9525 | 20 | 80 |
| PANTONE 9044 | 29 | 80 |
| PANTONE 9560 | 18 | 80 |
| PANTONE 9045 | 30 | 80 |
| PANTONE 9503 | 29 | 80 |

| Color Name | Δ660 | DB Score |
| --- | --- | --- |
| PANTONE Blue 0821 C | 55 | 66 |
| PANTONE 2226 C | 67 | 66 |
| PANTONE 435 C | 44 | 66 |
| PANTONE 2268 C | 67 | 66 |
| PANTONE 2205 C | 61 | 65 |
| PANTONE 7464 C | 45 | 65 |
| PANTONE 2198 C | 64 | 65 |
| PANTONE 5585 C | 52 | 65 |
| PANTONE 325 C | 57 | 65 |
| PANTONE 5513 C | 43 | 65 |
| PANTONE 2218 C | 68 | 64 |
| PANTONE 2155 C | 56 | 64 |
| PANTONE 2227 C | 69 | 64 |
| PANTONE 623 C | 59 | 63 |
| PANTONE 2282 C | 33 | 63 |
| PANTONE 337 C | 50 | 63 |
| PANTONE 2261 C | 62 | 63 |
| PANTONE 305 C | 61 | 63 |
| PANTONE 443 C | 68 | 62 |
| PANTONE 290 C | 36 | 62 |

| Color Name | Δ660 | DB Score |
| --- | --- | --- |
| PANTONE 206 C | 5 | 2 |
| PANTONE 2024 C | 3 | 2 |
| PANTONE 223 C | 2 | 2 |
| PANTONE 185 C | 4 | 2 |
| PANTONE 1585 C | 3 | 2 |
| PANTONE 224 C | 3 | 2 |
| PANTONE 2346 C | 3 | 2 |
| PANTONE 2026 C | 3 | 2 |
| PANTONE 1555 C | 1 | 2 |
| PANTONE 2027 C | 4 | 2 |

Fig. 15A

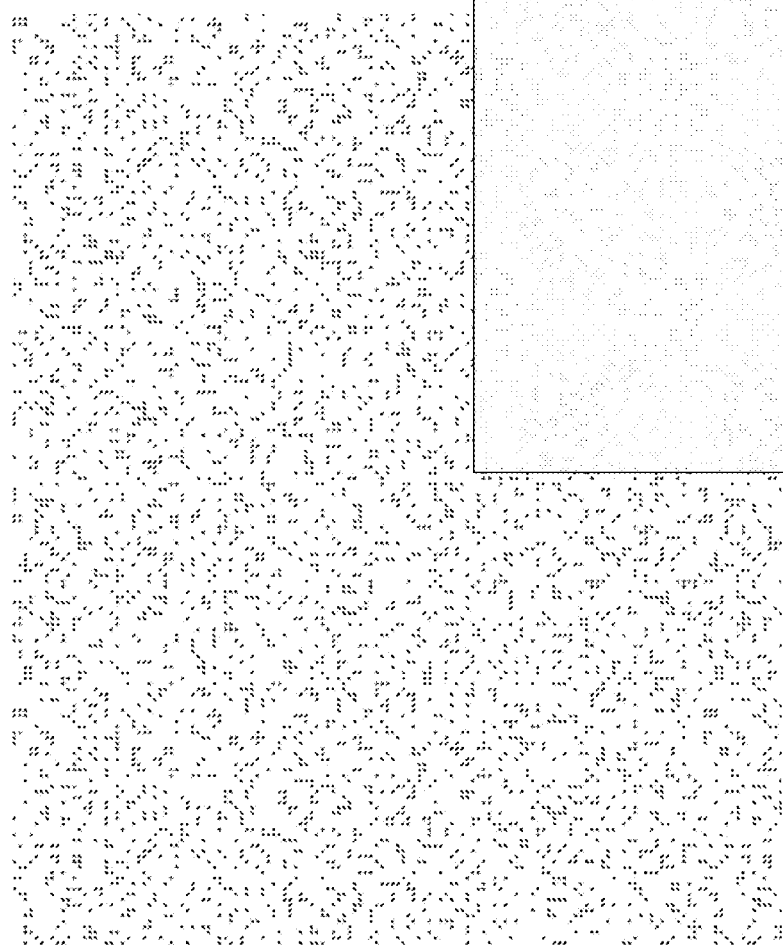
Fig. 16
Sparse mark carried by black ink over white background
Sparse mark carried by Pantone 9520 C over white background

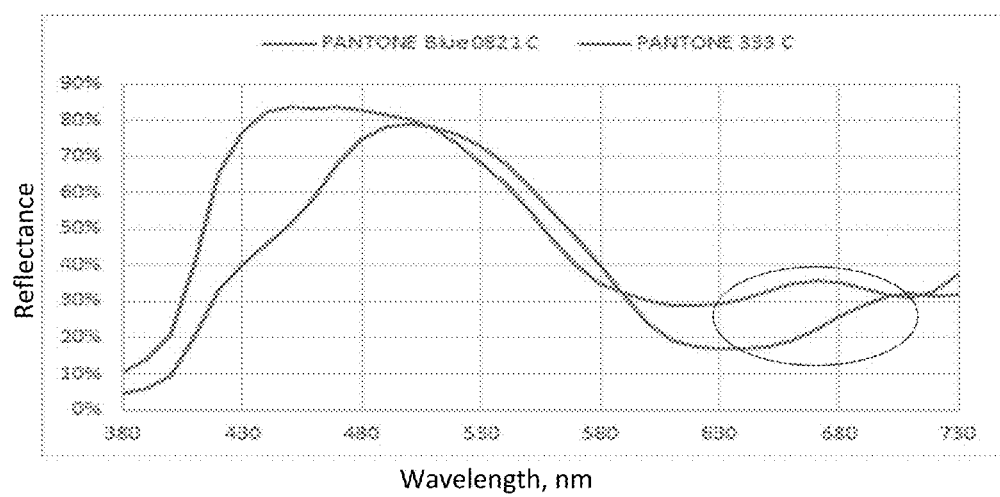
Fig. 17
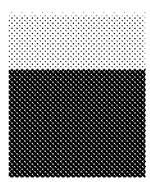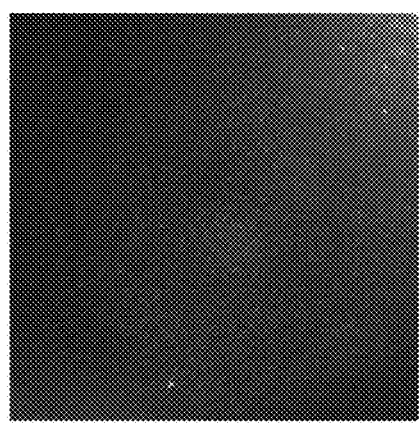
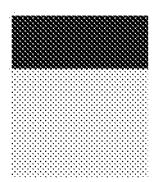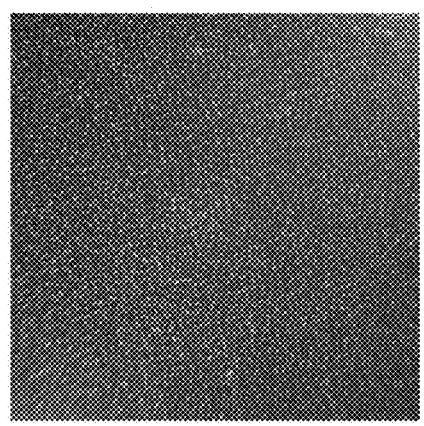
Fig. 18A                              Fig. 18B

SIGNAL ENCODING FOR DIFFICULT ENVIRONMENTS

RELATED APPLICATION DATA

This application is claims the benefit of U.S. Provisional Patent Application No. 62/438,886, filed Dec. 23, 2016. The present application is a continuation in part of U.S. patent application Ser. No. 15/261,005 (published as US 2018-0047126 A1), filed Sep. 9, 2016, which claims the benefit of U.S. Provisional Patent Application Nos. 62/375,418, filed Aug. 15, 2016, and 62/377,419, filed Aug. 19, 2016. The present application is also a continuation in part of U.S. patent application Ser. No. 15/418,364 (issued as U.S. Pat. No. 10,255,649), filed Jan. 27, 2017, which claims the benefit of U.S. Provisional Patent Application No. 62/430,297. This application is related to U.S. patent application Ser. No. 14/616,686, filed Feb. 7, 2015 (issued as U.S. Pat. No. 9,380,186), Ser. No. 14/725,399, filed May 29, 2015 (published as US 2016-0275639 A1), Ser. No. 15/072,884 (published as US 2017-0024840 A1), filed Mar. 17, 2016, Ser. No. 14/588,636, filed Jan. 2, 2015 (published as US 2015-0187039 A1, issued as U.S. Pat. No. 9,401,001), and Ser. No. 15/137,401, filed Apr. 25, 2016 (published as US 2016-0316098 A1); and PCT Application No. PCT/US17/46639 (published as WO 2018/034996), filed Aug. 11, 2017. Each of the patent documents mentioned above is hereby incorporated herein by reference in its entirety, including all drawings and any appendices.

TECHNICAL FIELD

This disclosure relates to advanced signal processing technology including image processing and encoded signaling techniques such as embedding and digital watermarking.

BACKGROUND AND SUMMARY

Portions of this disclosure are described in terms of, e.g., encoded signals for digital designs, product packaging (sometimes just referred to herein as "packaging" or "package") and other objects. These encoding techniques can be used, e.g., to alter or transform how color inks are printed on various physical substrates. The alterations or transformations preferably result in a printed design carrying machine readable indicia on a surface of a physical object.

Various forms of signal encoding (or "embedding") include, e.g., "steganographic encoding" and "digital watermarking." Digital watermarking is a process for transforming physical or electronic media to embed a machine-readable code (or "auxiliary data") into the media. In some cases the media is transformed such that the embedded code is "obscured" or "generally imperceptible" relative to an overt symbology (e.g., 1D or 2D barcode), yet may be detected through an automated detection process. Obscured and generally imperceptible in this context means that the luminance/chrominance variations in the artwork due to the digital watermarking are not noticeable to a human viewer inspecting the package from a usual distance (e.g., 20 inches) under normal retail lighting (e.g., 50-85 foot candles), who has not previously been alerted to the existence of the digital watermarking.

Digital watermarking is often applied to electronic or physical objects such as printed objects, images, audio signals, and video signals. However, it may also be applied to other types of objects, including, e.g., product packaging, electronics such as circuit boards and CPUs, stickers, logos, product hang tags, line-art, software, multi-dimensional graphics models, and surface textures of such objects.

In this document we use the terms "digital watermark" and "watermark" (and various forms thereof) interchangeably.

Auxiliary data embedding systems typically include two components: an encoder (or embedder) that embeds the auxiliary signal in a host image or object, and a decoder (or detector) that detects and reads the embedded auxiliary signal from the host image or object. The encoder may embed the auxiliary signal by altering or transforming a host image or object to carry the auxiliary data. The detection component analyzes a suspect image, object or signal to detect whether an auxiliary signal is present, and if so, extracts or reads information carried in it.

Several particular digital watermarking and auxiliary data embedding techniques have been developed. The reader is presumed to be familiar with the literature in this field. Particular techniques for embedding and detecting imperceptible digital watermarks are detailed in the assignee's patent documents including US Published Patent Application Nos. 20150156369 and 20160217547; U.S. patent application Ser. No. 14/725,399, filed May 29, 2015 (issued as U.S. Pat. No. 9,635,378), and Ser. No. 14/842,575 (issued as U.S. Pat. No. 9,819,950), filed Sep. 1, 2015; International Application No. PCT/US2015/44904, filed Aug. 12, 2015 (published as WO 2016025631 A1) and U.S. Pat. Nos. 7,054,461, 7,286,685, and 9,129,277. Related technology is detailed in Assignee's U.S. patent application Ser. No. 15/073,483 (issued U.S. Pat. No. 9,754,341), filed Mar. 17, 2016. Each of the patent documents mentioned in this paragraph are hereby incorporated herein by reference in its entirety, including all drawings and any appendices.

One aspect of the disclosure is an image processing method comprising: obtaining first color values representing luminance, color channel 'a' and color channel 'b' for a first color; obtaining second color values representing luminance, color channel 'a' and color channel 'b' for a substrate or a background color; obtaining first reflectance values for the first color at a machine-vision wavelength; obtaining second reflectance values for the substrate or the background color at the machine-vision wavelength; combining the first reflectance values and the second reflectance values to yield a reflectance difference; using one or more programmed processors, determining an encoded signal error that is associated with the first color values, the second color values and the reflectance difference; using one or more programmed processors, determining a color error that is associated with the first color values, the second color values and the reflectance difference; and combining the encoded signal error and the color error to yield a combined error, and evaluating the combined error to determine whether to transform digital imagery to carry an encoded signal.

Another aspect of the disclosure is an image processing method comprising: obtaining first color values representing luminance*, color channel 'a*' and color channel 'b*' for a first plurality of colors; obtaining second color values representing luminance*, color channel 'a*' and color channel 'b*' for a substrate or a background color; using one or more programmed processors, determining an encoded signal error that is associated with the first color values, the second color values, and a first machine-vision wavelength difference between the first color and the substrate or the background color; using one or more programmed processors, determining a color error that is associated with the first color values, the second color values, and the first machine-vision wavelength difference between the first color and the substrate or the background color; and combining the encoded signal error and the color error for each of the first plurality of colors to yield a plurality of combined errors, and evaluating the combined errors to determine a target color from the plurality of colors in terms of signal robustness and signal visibility associated with the first machine-vision wavelength.

Yet another aspect of the disclosure is a retail product package comprising: a first substrate comprising a first area; a sparse mark pattern printed within the first area with a first ink; an ink flood printed over the sparse mark pattern and the first substrate within the first area with a second ink, in which the second ink comprises a larger tack or adhesion with the first substrate relative to a tack or adhesion with the first ink, the first area comprising a first region comprising a layer of ink flood and a layer of first substrate, the first area further comprising a second region comprising a layer of ink flood, a layer of sparse mark pattern and a layer of first substrate, in which the first region and the second region comprise a spectral reflectance difference at a machine-vision wavelength in the range of 8%-60%.

Further aspects, features and advantages will become even more apparent with reference to the following detailed description, claims and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 illustrates a portion of a sparse signal.

FIG. 14 illustrates the sparse signal of FIG. 13, modified to reduce the signal using a line screen approach.

FIG. 15A shows various colors along with their respective "Digimarc Barcode" (also referred to as "DB") scores.

FIG. 15B shows reflectance curves for a Pantone 9520 C and Paper White C.

FIG. 16 shows two printed areas including encoded signals.

FIG. 17 shows reflectance curves for Pantone Blue 0821 C and Pantone 333 C.

FIG. 18A shows a printed patch including black printed first, with Pantone 9520 C printed over the top of the black.

FIG. 18B shows a printed patch including Pantone 9520 C printed first, with black printed on top.

DETAILED DESCRIPTION

Introduction

The following detailed description is divided into four (4) general sections. It should be understood from the outset, however, that we expressly contemplate combining subject matter from one such section with one or more of the other sections. Thus, the sections and section headings are provided for the reader's convenience and are not intended to impose restrictions or limitations. The sections include: I. Signal Encoder and Decoder; II. Sparse Marks; III. Color Selection and Ink Trapping; and IV. Operating Environments.

I. Signal Encoder and Decoder

Encoder/Decoder

Figure 1:
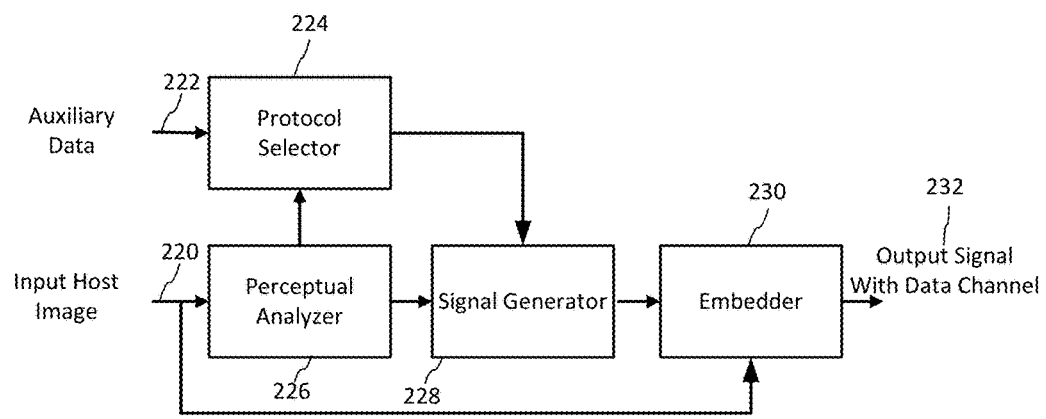
FIG. 1 is a block diagram of a signal encoder for encoding a digital payload signal into an image signal.
Figure 2:
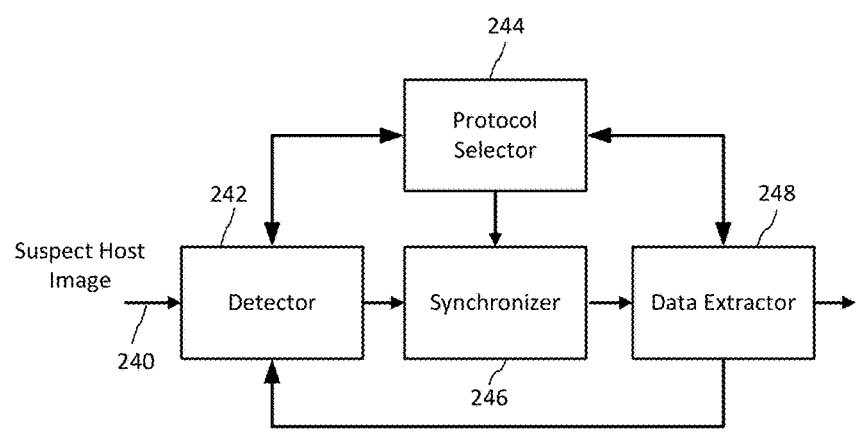
FIG. 2 is a block diagram of a compatible signal decoder for extracting the digital payload signal from an image signal.

FIG. 1 is a block diagram of a signal encoder for encoding a digital payload signal into an image signal. FIG. 2 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 2 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., Ser. No. 14/725,399 (issued as U.S. Pat. No. 9,635,378), entitled SPARSE MODULATION FOR ROBUST SIGNALING AND SYNCHRONIZATION, incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (issued as U.S. Pat. No. 9,380,186), Ser. No. 14/588,636 (published as US 2015-0187039 A1) and Ser. No. 13/975,919 (issued as U.S. Pat. No. 9,449,357), Patent Application Publication No. US 2010-0150434 A1, and U.S. Pat. No. 7,352,878, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. patent application Ser. No. 13/975,919 (issued as U.S. Pat. No. 9,449,357); and see also, U.S. patent application Ser. No. 14/588,636, filed Jan. 2, 2015 (published as US 2015-0187039 A1), filed Jan. 2, 2015, and Ser. No. 15/137,401 (issued as U.S. Pat. No. 9,565,335), filed Apr. 25, 2016, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. patent application Ser. No. 14/616,686 (issued as U.S. Pat. No. 9,380,186), Ser. No. 14/588,636 (issued as U.S. Pat. No. 9,401,001) and Ser. No. 13/975,919 (issued as U.S. Pat. No. 9,449,357), Patent Application Publication No. US 2010-0150434 A1, and U.S. Pat. No. 7,352,878, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. Nos. 14/616,686, 14/588,636 and 13/975,919 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 2, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 3:
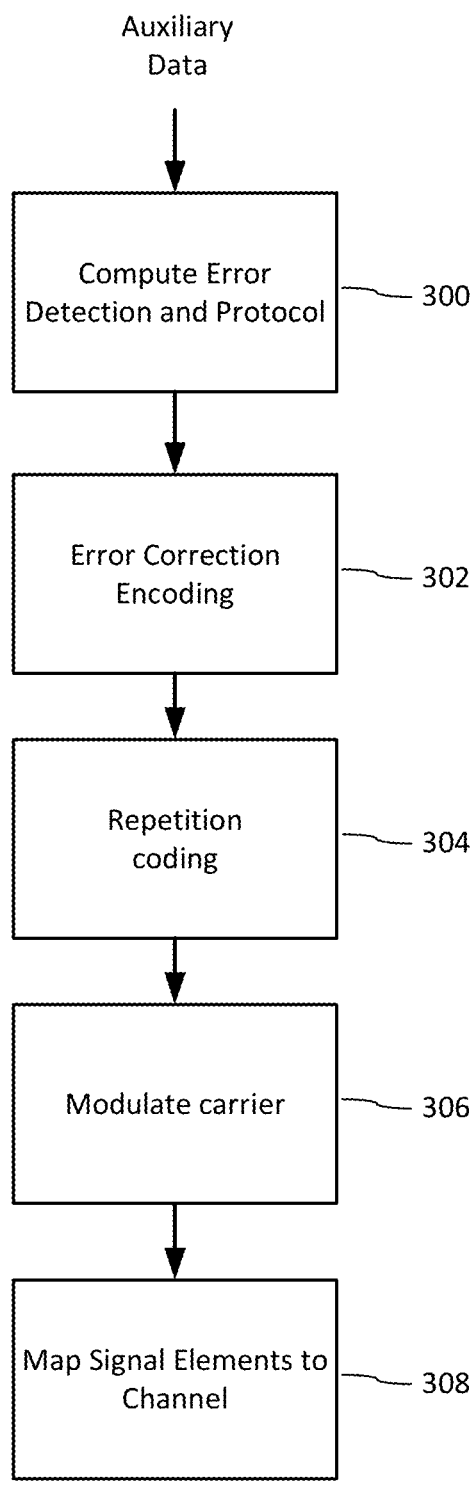
FIG. 3 is a flow diagram illustrating operations of a signal generator.

FIG. 3 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Patent Application Publication No. US 2012-0078989 A1, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. patent application Ser. No. 14/724,729 (published as 20160217547), which are hereby incorporated by reference in their entirety.

Signal Embedding in Host

Figure 4:
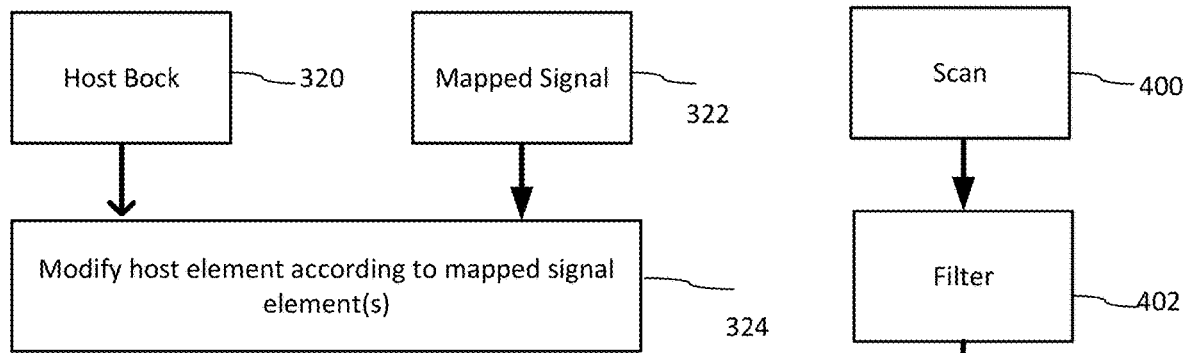
FIG. 4 is a diagram illustrating embedding of an auxiliary signal into host image signal.

FIG. 4 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 3, the product or label identifier (e.g., in GTIN format) and additional flag or flags used by control logic are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100 DPI or 300 DPI. In this example, we will explain the case where the spatial resolution of the embedded signal is 300 DPI, for an embodiment where the resulting image with encode data is printed on a package or label material, such as a paper, plastic or like substrate. The payload is repeated in contiguous tiles each comprised of 256 by 256 of embedding locations. With these embedding parameters, an instance of the payload is encoded in each tile, occupying a block of host image of about 1.28 by 1.28 inches. These parameters are selected to provide a printed version of the image on paper or other substrate. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as discussed in U.S. Pat. No. 9,311,640, which is hereby incorporated herein by reference in its entirety.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (issued as U.S. Pat. No. 9,747,656). In the latter, the tile size may be increased to accommodate the differential encoding of each encoded bit in a pattern of differential encoded bit cells, where the bit cells corresponding to embedding locations at a target resolution (e.g., 300 DPI).

Our U.S. patent application Ser. No. 14/725,399 (issued as U.S. Pat. No. 9,635,378), describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publication No. US 2010-0150434 A1 and U.S. patent application Ser. No. 14/725,399, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit.

Figure 5:
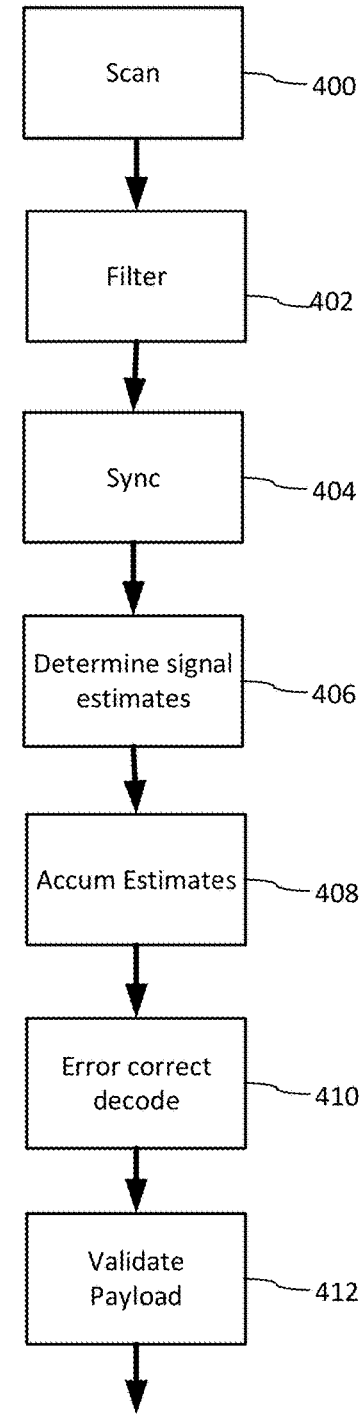
FIG. 5 is a flow diagram illustrating a method for decoding a payload signal from a host image signal.

FIG. 5 is a flow diagram illustrating a method for decoding a payload signal from a host image signal. Implementations of a watermark decoder and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:

Digimarc Barcode SDKs
Digimarc Barcode Plugin

Returning to FIG. 5, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see co-pending U.S. application Ser. No. 14/332,739, published as US 2015-0030201 A1, which are each hereby incorporated by reference in its entirety.

Please also see U.S. Provisional Patent Application No. 62/174,454, filed Jun. 11, 2015, and U.S. patent application Ser. No. 15/176,498 (issued as U.S. Pat. No. 9,922,220), filed Jun. 8, 2016, which are hereby incorporated herein by reference in their entirety, for more on block selection where processing time is limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication No. US 2013-0329006 A1, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614, 914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182, 778, to recover rotation and scale of a synchronization signal comprised of peaks in the Fourier domain. To recover translation, the phase correlation method of U.S. Pat. No.

6,614,914 is used, or phase estimation and phase deviation methods of U.S. Pat. No. 9,182,778 are used.

Alternative methods perform synchronization on an implicit synchronization signal, e.g., as detailed in Ser. No. 14/724,729 (published as 20160217547).

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

II. Sparse Marks

We refer to one embedding approach as "sparse" marking (or "sparse marks") as the data carrying signal is formed as a relatively sparse array of signal elements, compared to a more continuous array of signal elements. For visual media, the sparse array of elements works well on portions of a host image that are uniform or solid tones or appear largely blank. With greater sophistication in the signaling, it also is effective in encoding blank areas around text of a document, label, visual display or package, as our signaling schemes employ robust data encoding strategies to mitigate impact of interference from the text. In one embodiment, a sparse mark is comprised of a pattern of spatial locations where ink is deposited or not. For example, the sparse signal may be comprised of ink dots on a light background, such that the signal forms a pattern of subtly darker spatial locations. The signal is designed to be sparse by the spacing apart of the darker locations on the light background. Conversely, the signal may be designed as an array of lighter "holes" on a relatively darker background. See, for example, U.S. Pat. Nos. 6,345,104, 6,993,152 and 7,340,076, which are hereby incorporated by reference in their entirety.

The sparse signal has minimal impact on visual quality due to its sparse arrangement. However, the trade-off for applications like automatic object identification is that more sophistication is required in the data signaling methodology to ensure that the data carried within the sparse signal may be reliably and efficiently recovered in many different and challenging environments. The sparse nature of the signal dictates that less payload may be encoded per unit of object surface area. Further, within the sparse signal, there is a trade-off between allocating signal for payload capacity versus signal for robustness. In the latter category of robustness, the signaling scheme must support recovery in environments of geometric distortion, which occurs when the sparse signal is imaged from various angles, perspectives and distances, in the presence of noise of various types that tends to interfere with the data signal.

There are various sources of geometric distortion that need to be addressed to reliably recover the payload in the sparse signal. Examples of geometric distortion include signal cropping and warping. Cropping truncates portions of the sparse signal, e.g., in cases where only a portion is captured due to occlusion by other objects or incomplete capture by a scanner. Warping occurs when the surface on which the sparse signal is applied is curved (on cups or cans) or wrinkled (on bags and flexible plastic or foil pouches) and when the sparse signal is imaged from a surface at various perspectives.

The design of a signaling scheme must also account for practical challenges posed by constraints on digital circuitry, processors and memory for encoding and decoding. These include computational efficiency, power consumption, memory consumption, memory bandwidth, use of network bandwidth, cost of hardware circuitry or programmable processors/circuitry, cost of designing and integrating encoders and decoders within signal transmitter and receiver, equipment, etc. For example, some encoding schemes may provide optimized encoding or decoding, but may not be applicable because they are too slow for encoding or decoding in real time, e.g., as the host signal is being transmitted, received, updated, or being processed with multiple other signal processing operations concurrently.

One consideration in the design of a sparse signal is the allocation of signal for data carrying and for synchronization. Another consideration is compatibility with other signaling schemes in terms of both encoder and decoder processing flow. With respect to the encoder, the sparse encoder should be compatible with various signaling schemes, including dense signaling, so that it each signaling scheme may be adaptively applied to different regions of an image design, as represented in an image design file, according to the characteristics of those regions. This adaptive approach enables the user of the encoder tool to select different methods for different regions and/or the encoder tool to be programmed to select automatically a signaling strategy that will provide the most robust signal, yet maintain the highest quality image, for the different regions.

One example of the advantage of this adaptive approach is in product packaging where a package design has different regions requiring different encoding strategies. One region may be blank, another blank with text, another with a graphic in solid tones, another with a particular spot color, and another with variable image content.

With respect to the decoder, this approach simplifies decoder deployment, as a common decoder can be deployed that decodes various types of data signals, including both dense and sparse signals.

One approach to sparse signal design is to construct the signal to have optimal allocation of payload and synchronization components, without regard to compatibility with legacy dense signaling protocols. In such an approach, the signaling techniques for data and synchronization are developed to minimize interference between the variable data carrying and synchronization functions of the sparse signal. For example, if the sparse signal is being designed without needing to be compatible with a dense signaling strategy, it can be designed from the start to be comprised as an array of sparse elements, with variable data and sync functions. One advantage is that there is no need to apply a threshold or quantizer to remove aspects of a signal to convert it into a sparse format.

Another approach is to design a sparse signal to be compatible with a legacy signaling scheme. Within this type of an approach, one can employ techniques to convert a legacy signaling scheme into a sparse signal. In particular, in one such approach, the process of generating a sparse signal begins with a dense watermark signal, and selectively removes elements of it to produce a sparse signal, while retaining sufficient amounts of data and synchronization functionality.

As we detail further below, there are several ways to convert dense signals to sparse signals. Before exploring these methods, we start by further considering properties of dense signals relative to sparse signal. In some cases, a dense signal is comprised of a multi-valued watermark tile (e.g., eight bit per pixel image approximating a continuous signal), which is a block of m by n embedding locations, where m and n are the integer coordinates of embedding locations in a tile (e.g., m=n=128, 256, 512, etc.). The value at each tile corresponds to an adjustment to be made to a corresponding location in a host image to encode the watermark. The tile is repeated contiguously in horizontal and vertical directions over a region of the host image, possibly the entire image. The signal is considered "dense" relative to a sparse signal, when the adjustments are densely spaced, in contrast to a sparse signal, where its signal elements are spread apart in the tile. Dense signals are preferred for host signals that are similarly dense, varying, and multi-valued, enabling embedding by adjusting the values of the host signal at the embedding locations. A dense embedding enables higher capacity embedding for both data and sync functions within a tile.

Converting a dense signal to a sparse signal still achieves the objective of reliable signaling due to a couple of characteristics of the signal and host. First, the signal is redundant in the tile and across repeated tiles, so removing a portion of it from each tile leaves sufficient signal for reliable and complete recovery of the payload. Signal detection is aggregated across tiles to further assist in reliable recovery, as detailed, for example in U.S. Pat. No. 6,614,914. Second, sparse signaling is adaptively applied where there is less likely to be interference with host signal content, and as such, its sparse property is relatively less impacted by interference.

Some approaches to converting dense to sparse signals include, but are not limited to:

Quantizing the array of multi-valued signal to produce a sparse array of elements by quantizing some sub-set of the values to zero;

Selecting a sub-set of a dense signal, with selection being adapted to retain data signal and sync function within a tile (keeping in mind that such selection may be implemented across tile boundaries in a manner that reliable detection can be made with the aid of extraction from an area larger than that of a single tile);

Selecting locations to retain based on a particular signal pattern, which may be variable or fixed per tile;

Selection or locations based on a pattern of the data signal or a synchronization signal; and Combinations of the above, where, for example, quantizing inherently acts to select values to retain and sets the value of the sparse element.

These methods are not mutually exclusive and may be combined in various ways. The case of using quantization may also include applying a fixed or adaptive threshold operation to convert a multi-valued dense signal to a sparse signal. Use of a threshold operation to generate a sparse signal is described, for example, in U.S. Pat. No. 6,993,152, which is incorporated by reference above. Below, we describe further details through examples illustrating various methods.

Whether one starts with a sparse signal or generates one by converting a dense signal, it should be noted that techniques for modulating variable data into the sparse signal can vary quite a bit. Our U.S. Pat. Nos. 5,862,260, 6,614, 914, and 6,345,104 describe several examples of modulation for carrying variable data in image content, and U.S. patent application Ser. No. 14/724,729, which are all hereby incorporated herein by reference in their entirety, describes yet additional examples, including differential modulation methods. These documents also describe explicit and implicit synchronization signals.

As introduced above with reference to FIG. 3, there are stages of modulation/demodulation in the encoder, so it is instructive to clarify different types of modulation. One stage is where a data symbol is modulated onto an intermediate carrier signal. Another stage is where that modulated carrier is inserted into the host by modulating elements of the host. In the first case, the carrier might be pattern, e.g., a pattern in a spatial domain or a transform domain (e.g., frequency domain). The carrier may be modulated in amplitude, phase, frequency, etc. The carrier may be, as noted, a pseudorandom string of 1's and 0's or multi-valued elements that is inverted or not (e.g., XOR, or flipped in sign) to carry a payload or sync symbol.

As noted in our application Ser. No. 14/724,729, carrier signals may have structures that facilitate both synchronization and variable data carrying capacity. Both functions may be encoded by arranging signal elements in a host channel so that the data is encoded in the relationship among signal elements in the host. Application Ser. No. 14/724,729 specifically elaborates on a technique for modulating, called differential modulation. In differential modulation, data is modulated into the differential relationship among elements of the signal. In some watermarking implementations, this differential relationship is particularly advantageous because the differential relationship enables the decoder to minimize interference of the host signal by computing differences among differentially encoded elements. In sparse signaling, there may be little host interference to begin with, as the host signal may lack information at the embedding location.

Nevertheless, differential modulation may be exploited or the scheme may be adapted to allow it to be exploited for sparse signaling. For example, sparse elements may be designed such that they have a differential relationship to other elements, either within the sparse signal (e.g. the sync component), or within the host signal (e.g., neighboring background of each sparse element). A sparse element where a dot of ink is applied, for example, has a differential relationship with neighbors, where no ink is applied. Data and sync signals may be interleaved so that they have such differential relationships. A sparse signal may be encoded differentially relative to a uniform or solid tone, where some sparse elements darken the tone (e.g., darker dots), and others lighten it (e.g., lighter holes).

Differential schemes may further be employed as a preliminary stage to generate a dense multi-valued signal, which in turn is converted to a sparse signal using the above described schemes for conversion. The encoder then converts this dense signal to a sparse signal, maintaining where possible, differential relationships.

Another form of modulating data is through selection of different carrier signals to carry distinct data symbols. One such example is a set of frequency domain peaks (e.g., impulses in the Fourier magnitude domain of the signal) or sine waves. In such an arrangement, each set carries a message symbol. Variable data is encoded by inserting several sets of signal components corresponding to the data symbols to be encoded. The decoder extracts the message by correlating with different carrier signals or filtering the received signal with filter banks corresponding to each message carrier to ascertain which sets of message symbols are encoded at embedding locations.

Having now illustrated methods to modulate data into the watermark (either dense or sparse), we now turn to the issue of designing for synchronization. For the sake of explanation, we categorize synchronization as explicit or implicit. An explicit synchronization signal is one where the signal is distinct from a data signal and designed to facilitate synchronization. Signals formed from a pattern of impulse functions, frequency domain peaks or sine waves is one such example. An implicit synchronization signal is one that is inherent in the structure of the data signal.

An implicit synchronization signal may be formed by arrangement of a data signal. For example, in one encoding protocol, the signal generator repeats the pattern of bit cells representing a data element. We sometimes refer to repetition of a bit cell pattern as "tiling" as it connotes a contiguous repetition of elemental blocks adjacent to each other along at least one dimension in a coordinate system of an embedding domain. The repetition of a pattern of data tiles or patterns of data across tiles (e.g., the patterning of bit cells in our U.S. Pat. No. 5,862,260) create structure in a transform domain that forms a synchronization template. For example, redundant patterns can create peaks in a frequency domain or autocorrelation domain, or some other transform domain, and those peaks constitute a template for registration. See, for example, our U.S. Pat. No. 7,152,021, which is hereby incorporated by reference in its entirety.

The concepts of explicit and implicit signaling readily merge as both techniques may be included in a design, and ultimately, both provide an expected signal structure that the signal decoder detects to determine geometric distortion.

In one arrangement for synchronization, the synchronization signal forms a carrier for variable data. In such arrangement, the synchronization signal is modulated with variable data. Examples include sync patterns modulated with data.

Conversely, in another arrangement, that modulated data signal is arranged to form a synchronization signal. Examples include repetition of bit cell patterns or tiles.

These techniques may be further exploited in sparse signal design because the common structure for carrying a variable payload and synchronizing in the decoder is retained in the sparse design, while minimizing interference between the signal components that provide these functions. We have developed techniques in which one signal component is a carrier of the other component, and in these techniques, the process of generating a sparse signal produce a signal that performs both functions.

The variable data and sync components of the sparse signal may be chosen so as to be conveyed through orthogonal vectors. This approach limits interference between data carrying elements and sync components. In such an arrangement, the decoder correlates the received signal with the orthogonal sync component to detect the signal and determine the geometric distortion. The sync component is then filtered out. Next, the data carrying elements are sampled, e.g., by correlating with the orthogonal data carrier or filtering with a filter adapted to extract data elements from the orthogonal data carrier. Signal encoding and decoding, including decoder strategies employing correlation and filtering are described in our co-pending application Ser. No. 14/724,729, and these strategies may be employed to implement this approach for sparse signaling.

Additional examples of explicit and implicit synchronization signals are provided in our previously cited U.S. Pat. Nos. 6,614,914, and 5,862,260. In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Publication US 2012-0078989 A1, which is hereby incorporated by reference in its entirety, provides additional methods for detecting an embedded signal with this type of structure and recovering rotation, scale and translation from these methods.

Additional examples of implicit synchronization signals, and their use, are provided in U.S. Pat. Nos. 6,614,914, 5,862,260, and application Ser. No. 14/724,729 as well as U.S. Pat. Nos. 6,625,297 and 7,072,490, which are hereby incorporated by reference in their entirety.

Figure 6:
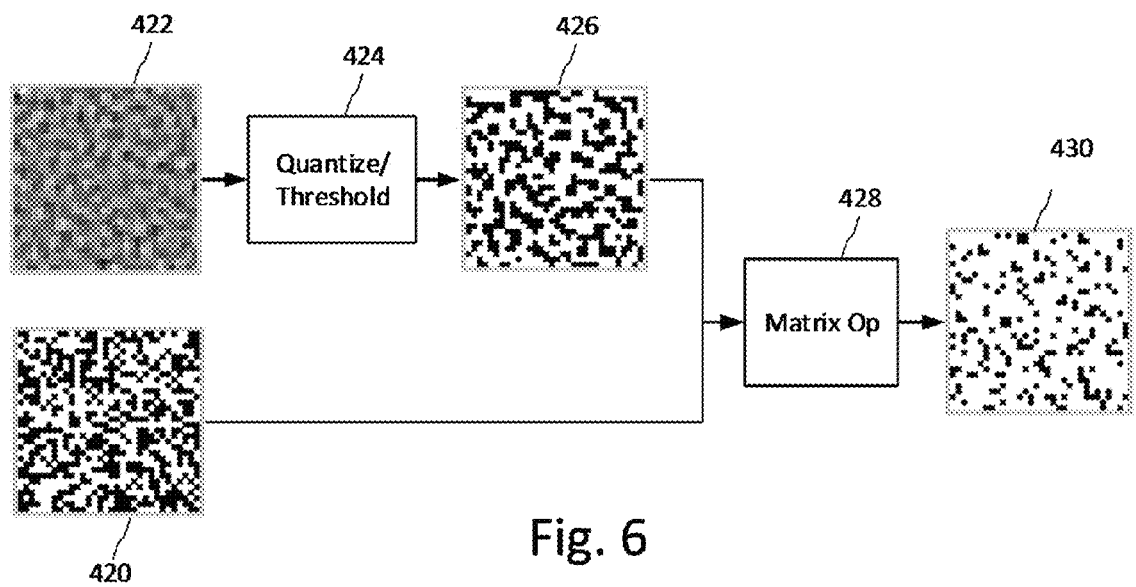
FIG. 6 is a diagram illustrating an example of a sparse signal generator.

Returning now to sparse signal design, we now provide detailed examples of sparse signaling techniques. FIG. 6 is a diagram illustrating an embodiment of a sparse signal generator. The signal generator starts with a tile of two signal components, one carrying variable data 420, and one providing a synchronization function 422. The synchronization signal is multi-valued per pixel, and it is passed through a quantizer 424 to convert it to a signal with fewer levels per pixel. In its simplest form, the quantizer converts the multi-valued signal into a binary signal, represented as black and white pixels, by a threshold operation. The threshold operation for each pixel within a tile compares each value with a threshold. For binary signals, elements below the threshold are shown as black here, while elements above the threshold are white. As noted, this is simply representative of a modulation state of an optical property at a sparse element, such as darker or lighter relative to background, and is not particularly limited to rendering black and white pixels.

The variable data signal 420 is comprised of elements having one of two values (e.g., 1 or 0, A, −A). As explained previously, a payload signal may be transformed into a robust data signal through one or more modulation stages, e.g., error correction and modulating the error correction coded signal onto a binary carrier signal, which is the approach used in this embodiment. This modulated carrier is mapped to pixel locations within the tile to form data tile 420.

The signal generator of FIG. 6 produces a sparse signal by selectively combining elements of data tile 420 with the quantized synchronization signal 422. In the embodiment illustrated here, the signal generator performs a matrix operation 428 that selectively retains components of the data and synchronization tiles, while producing a sparse signal output 430. One particular matrix operation to generate dark sparse elements on a lighter background, as shown here, is to compute a logical AND operation between corresponding pixel locations within the data and synchronization tiles, such that pixels that are both black at the same coordinates in each tile remain black in the output. For other inputs (white AND white, black AND white, or white AND black), the output pixel is white at that coordinate.

In this approach, the black pixels of the message signal are retained at all coordinates in the tile where the synchronization signal also has a black pixel. This technique distributes sparse message elements within a tile according the spatial distribution of the synchronization signal. It ensures that there sufficient signal energy to carry the payload robustly, while preserving sufficient signal energy for synchronization. It also ensures that the sync signal does not interfere with the sparse message elements. This approach may be reversed in the case where the objective is to generate a sparse signal with light holes against a darker background, with quantization level set appropriately (see later illustrations of setting thresholds for holes in dark background).

This approach also demonstrates a signal generation method in which a multi-valued component is effectively merged with a binary component. The multi-valued synchronization tile is a spatial domain representation of synchronization template formed by peaks in the frequency domain. The binary valued payload carrying component is redundantly encoded and distributed over the tile. In particular, modulated carrier elements, with an equal number of binary 0 and 1 values are spread evenly over the spatial locations within a tile.

The principles of the method may be applied to alternative signal component inputs. The sync and data components may both be multi-valued and selectively quantized to a binary or M-ary form prior to merging with a selective combination of the components per tile location. Alternatively, both the sync and data components may be binary valued and merged with a logic operation. Finally, the data component may be multi-valued and the sync component binary valued, with the data component being quantized prior to merging with the sync component. The matrix operation to combine elements at tile coordinates may be adapted to retain sync and data components that are compatible (e.g., consistently valued or falling within the same quantization bin). This approach allows the generator to form sparse marks with dark elements on lighter background, lighter elements on darker background, or a combination of lighter and darker sparse elements against a mid-level tone background.

Quantization level (including threshold) and merging function may be set with adaptive parameters to bias the sparse signal toward data or sync elements.

Figure 7:
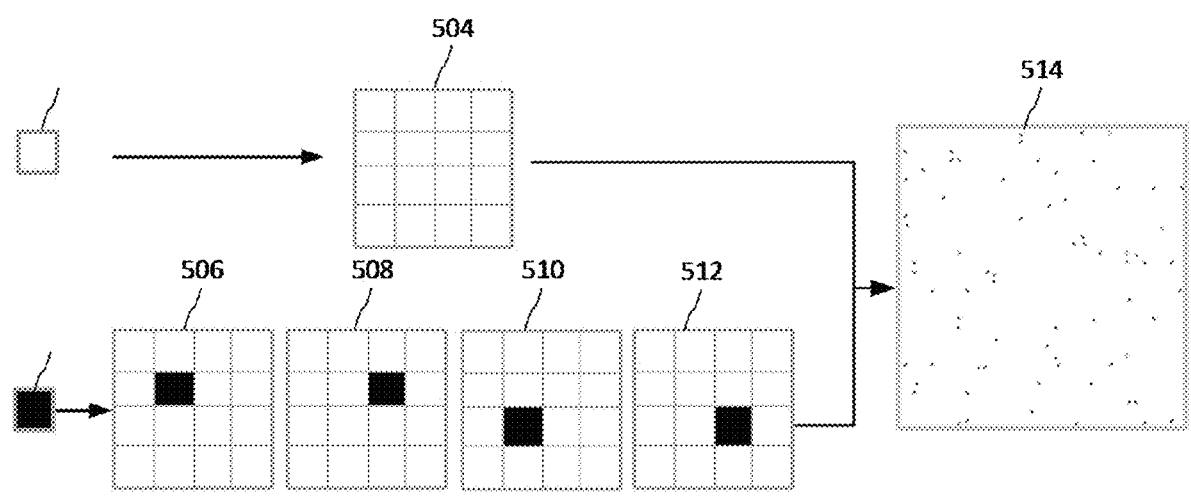
FIG. 7 is a diagram illustrating a refinement of a sparse signal generator like the one in FIG. 6.

FIG. 7 is a diagram illustrating a refinement of a sparse signal generator like the one in FIG. 6. In this refinement, the output of the sparse signal generator is further processed to transform the sparse signal elements. The sparse signal tile output from the generator has dimensions of m by n, where m and n are integer coordinates. For the sake of illustration, we use the example of m=n=128. In preparation for application to an object, the tile coordinates are mapped to coordinates in a target spatial resolution, which is typically expressed in Dots Per Inch (DPI). In FIG. 7, the mapping of a tile coordinate corresponds to a 4 by 4 block, which means that the effective DPI of the tile is one-fourth the DPI of the target image resolution. For example, the sparse mark tile may be generated to be 75 DPI for insertion into an image at 300 DPI, which translates to each tile coordinate (called a waxel) being a 4 by 4 block (waxel region) of pixels in the image coordinate system at 300 DPI. We refer to the region as the "bump" and ratio of target image resolution to waxel resolution as the bump size.

In the refinement of FIG. 7, light and dark waxels (500, 502) of the sparse tile are converted to the higher output resolution. This conversion enables additional flexibility in the shaping and location of each sparse element. Light elements 500 simply convert to 4×4 regions of light elements (504) at the waxel coordinates. In this example of dark sparse elements on light background, the flexibility is in the selection of the location of the dark element. In the technique of FIG. 7 the location of the dark element is pseudo-randomly selected from among 4 locations within the center 2×2 square within the 4×4 pixel region of a waxel. These four alternative locations are depicted in blocks 506, 508, 510 and 512. The resulting converted sparse signal output is shown as output tile 514. This conversion of the sparse input signal (e.g., at 75 DPI) to sparse output image signal at the target resolution (e.g., 300 DPI) does the following:

It makes the sparse signal more sparse;
It varies the location of the sparse element per embedding location so that sparse elements are not consistently falling on horizontal rows and vertical columns of the tile to make the sparse signal less visually perceptible;
It provides some protection against errors introduced by dot gain of the printing process. Even with errors in dot size and location due to dot gain, the resulting sparse element is still located within the correct tile region.

As we explain further below, this sparse output signal may also be converted further in the RIP process and as applied when printed or marked onto an object surface, or rendered for display on a screen or projected image.

Figure 8:
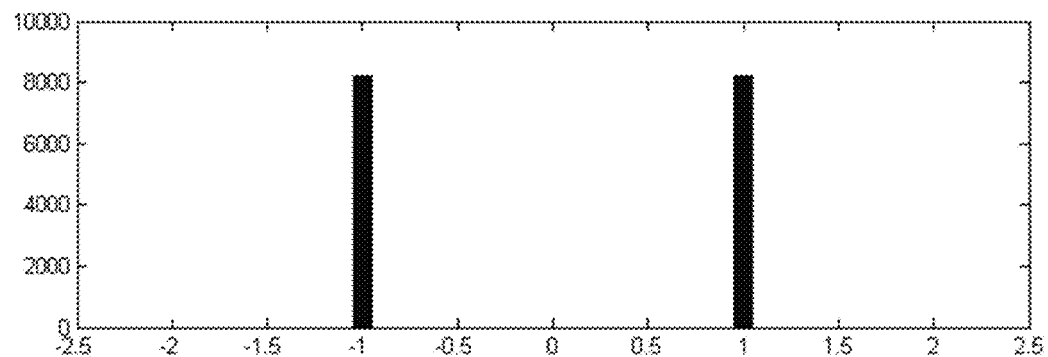
FIG. 8 is a histogram of a digital watermark signal component.
Figure 9:
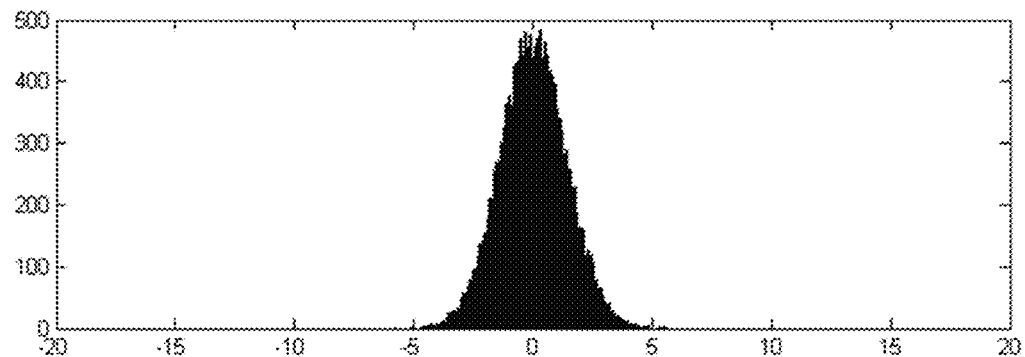
FIG. 9 is a histogram of another digital watermark signal component.
Figure 10:
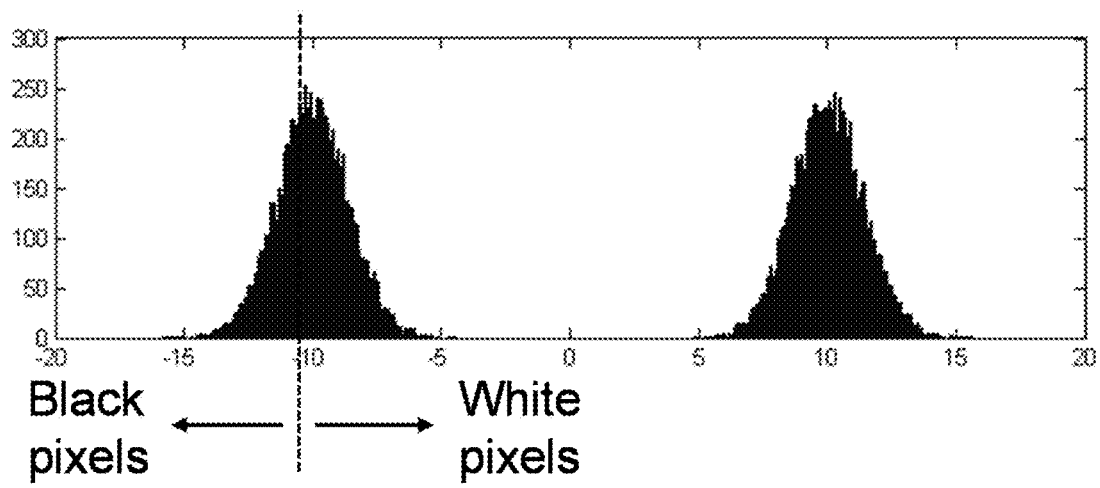
FIG. 10 is a histogram of a combination of the digital watermark signal components of FIGS. 8 and 9, and also depicts examples of different thresholds used to generate a binary image comprising black and white pixels from an image comprised of multi-valued pixels.
Figure 11:
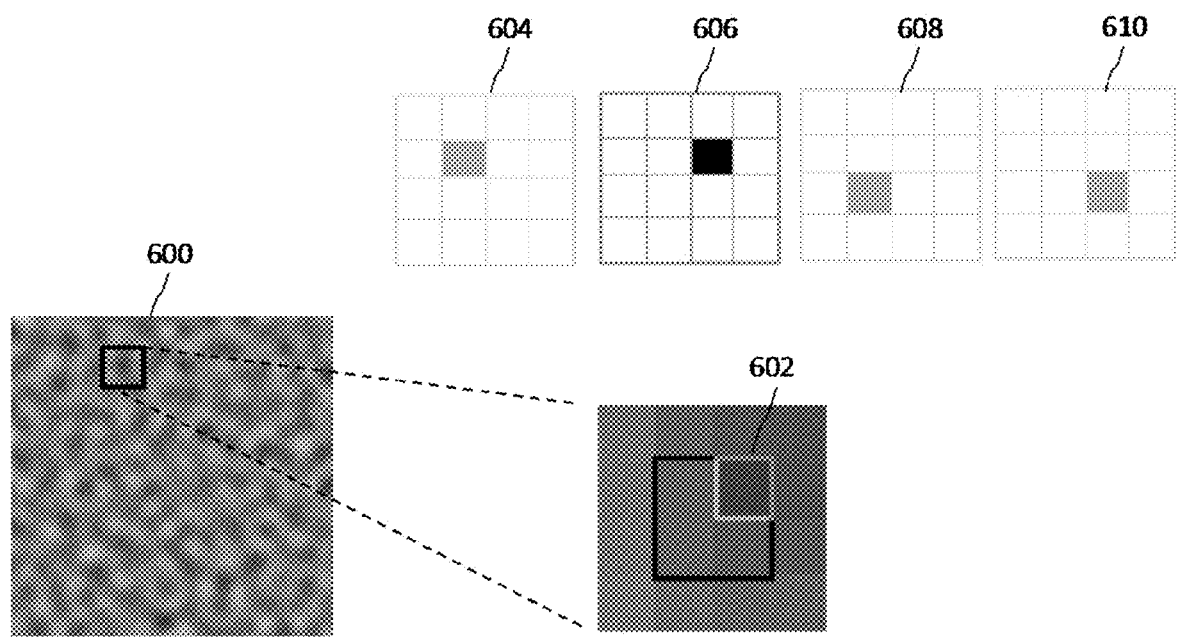
FIG. 11 is a diagram illustrating another refinement of the sparse signal generator of FIG. 6.

FIGS. 8-10 depict histograms of signal components to help illustrate aspects of sparse signal generation from different types of signals. FIG. 8 is a histogram of a digital watermark signal component, with waxel values that are at one of two different levels (−1, 1). This is an example of a histogram of a binary antipodal watermark tile, generated by modulating symbols onto binary antipodal carriers (e.g., a chipping sequence) to create message chips which are mapped pseudo-randomly into locations across the tile.

FIG. 9 is a histogram of another digital watermark signal component with multi-level values. This is an example of a spatial domain conversion of a sync signal tile formed as frequency domain peaks with pseudorandom phase.

FIG. 10 is a histogram of a combination of the digital watermark signal components of FIGS. 8 and 9, also depicting an example of a threshold operation to generate a binary image comprising black and white pixels from an image comprised of multi-valued pixels. In this example, the binary anti-podal signal elements are multiplied by a scale factor of 10 and then added to the multi-valued signal component with the distribution of FIG. 9. To create a sparse signal of darker dots on a lighter background, a threshold operation is applied, for example at the threshold level of the dashed line. Tile elements with a value below the threshold are set to dark ("black") and tile elements with a value above the threshold are set to light ("white"). This diagram provides a graphical depiction of the sparse signal generation process, which retains signal of both data carrying and sync components. The manner in which the payload is modulated onto carriers with half positive and half negative values ensures that the complete signal can be recovered from waxels of negative values or waxels of positive values. Here, for dark on light background, the negatively valued waxels are retained. Additionally, sufficient signal energy of the sync signal is also retained.

FIG. 10 is a diagram illustrating another refinement of the sparse signal generator of FIG. 6. This refinement leverages the same flexibility discussed in connection with FIG. 7 in establishing the sparse dot in a bump region. In this case, the sparse dot is located in the bump region where the sync signal level is at its lowest (for dark on light background sparse marks). A similar approach may be used for sparse holes in a darker background, with the sparse hole located where the synch signal level is highest within the bump region. Because of possible dot gain errors, this approach, like the one in FIG. 7, limits the selection of dot location to the center four pixels of the bump region.

In this variant of the sparse signal generation, the multi-valued sync tile (600) is provided at the resolution of the target image (e.g., 300 DPI in the continuing example, where waxels are at resolution of 75 DPI). The low point within the center 4×4 region of the waxel is at location 602. The signal generator places the sparse dot at this location 602, which is one (606) of the four candidate locations, 604, 606, 608, 610, selectable by the signal generator. This variant provides more sync signal strength as the sparse signal is generated based on a more detailed analysis of the sync signal level within the waxel.

Figure 12:
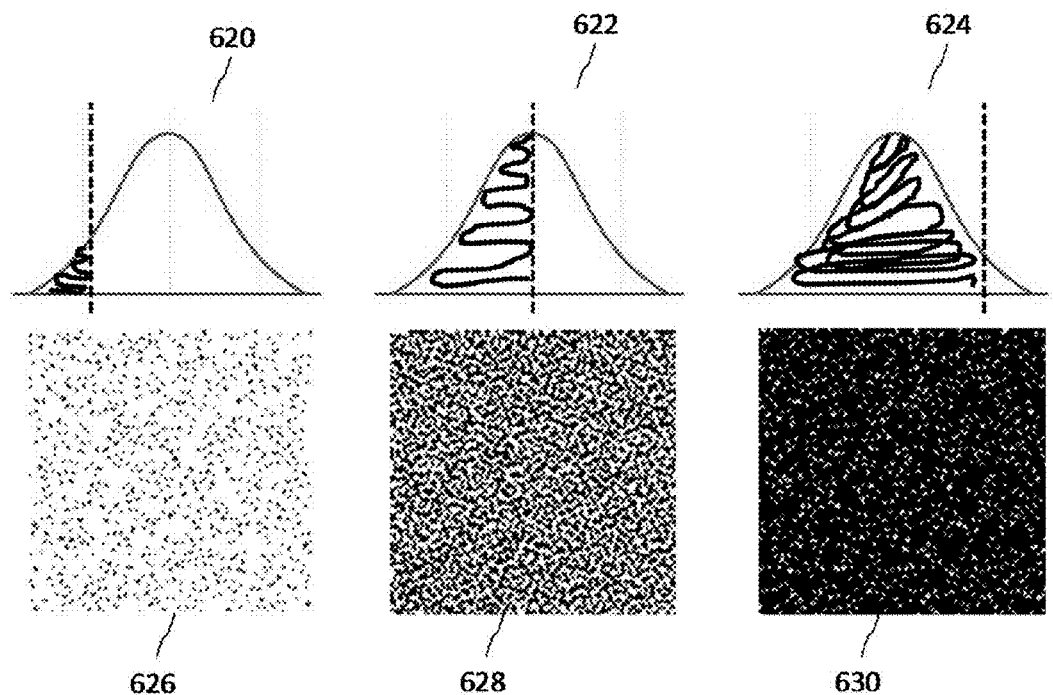
FIG. 12 is a diagram illustrating application of a threshold to a watermark signal, and the resulting output for three different thresholds.

FIG. 12 is a diagram illustrating application of a threshold to a continuous watermark signal, and the resulting output for three different thresholds. The top three boxes 620, 622 and 624, illustrate histograms of a continuous watermark signal, with three different threshold settings, shown as the dashed lines. Waxels with values below the threshold are set to black (darker pixels), while values above are set to white (lighter pixels). The selection of thresholds at these three different settings corresponds to the binary image signals 626, 628 and 630 shown below each histogram. These diagrams illustrate how the thresholds may be adjust to set the sparseness of the output signal. The strongest signal output for the continuous signal is where the threshold is set to zero.

FIG. 12 illustrates how the thresholding of the continuous watermark signal component controls the distribution of the sparse signal elements in the tile. The technique of combining the binary data signal with the continuous sync signal with a logical AND operation has the effect of distributing the data signal according to the sync signal.

FIG. 13 illustrates a portion of a sparse signal in magnified state to show dot structure in more detail and set up our explanation of an additional transformation of the sparse signal. In this particular example, the image resolution is 300 DPI, and the black squares are 2×2 black pixels at the center of the 4×4 waxel region (the "bump" region of a waxel, where waxels are at 75 DPI). In contrast to the examples of FIGS. 5 and 9 where a sparse dot is selected from among the 4 pixels of the center 2×2 pixels, here all four of the 2×2 pixels are set to black.

FIG. 14 illustrates the sparse signal of FIG. 13, modified to reduce the signal using a line screen approach. The sparse signal of FIG. 14 is derived from the signal of FIG. 13 by screening back the black dots from 100% to 15% with a 175 line screen. This is just one example of how the sparse signal can be made less perceptible by reducing the sparse elements. In this case, the signal is screened back. Another alternative is to reduce the sparse elements by diluting the ink used to print it (e.g., diluting the ink to create a 15% ink dot).

While we illustrate several examples with black or dark pixels on a light background, the same approach may be applied in different color inks, including spot colors. Applying the sparse signal with Cyan ink is particularly effective where the signal is captured with a scanner that predominantly captures image signal around a 660 nm wavelength, like most commercial 1D barcode scanners. The sparse elements may be reduced by screening, diluted ink, or other reduction techniques applied in the RIP and/or at the time of applying the sparse element to a substrate.

The above examples also show sparse signals are constructed from continuous or multivalued signal components and binary signal components. One component is a variable data carrier while another is a sync signal. The functions of the components may be reversed. Alternatively, both the data and sync components may be continuous signals that are selectively quantized and combined.

An alternative sparse signal generation process, for example, is a process that begins with sync and data components that are peaks in the frequency domain. The sync peaks are fixed to form a sync template, whereas the data peaks vary in location in frequency coordinates according to data symbols being encoded. These signal components form a continuous spatial domain signal when the combined peak signals are transformed to the spatial domain. This continuous signal is then converted to a sparse signal with a threshold operation using the above-explained approach to generate sparse image signals with both data and sync components. This approach enables the frequency components for sync and data to be selected so as to minimize interference between the two components.

In particular, the frequencies may be chosen to be orthogonal carrier signals, with some for sync, some for data, and some for both sync and data. The carriers may be modulated with variable data, e.g., using frequency shifting, phase shifting, etc.

One benefit of the above techniques is that they are compatible with signal decoders designed for dense watermark signal counterparts to the sparse signal. For details on decoders, including synchronization methods, please see our decoders detailed in U.S. Pat. Nos. 6,614,914, 5,862,260, and 6,345,104, and synchronization methods in US 2012-0078989 A1, which are each hereby incorporated herein in its entirety. Synchronization methods and variable data demodulation operate in a similar fashion as in dense watermark schemes. However, as noted, the extraction filters may be adapted to be optimized for sparse mark extraction.

Binary, multi-valued and continuous watermark signal components may also be generated using various techniques describe in our co-pending application Ser. No. 14/724,729, filed May 28, 2015, which is hereby incorporated herein by reference in its entirety, and which describes various watermark signal arrangements, differential modulation strategies, and synchronization approaches. These binary and multi-valued signal components may then be converted to sparse signals using the techniques described in this document. Though the decoding of such sparse signals follows the dense decoding counterparts, we provide an example of the processing flow below.

Even further details of our sparse marking technology can be found in assignee's U.S. patent application Ser. No. 14/725,399 (issued as U.S. Pat. No. 9,635,378), filed May 29, 2015, and Ser. No. 15/072,884 (published as US 2017-0024840 A1), filed Mar. 17, 2016, which are each hereby incorporated herein by reference in its entirety.

III. Color Selection and Ink Trapping

Digimarc is currently providing a machine-readable digital watermarking solution for retail packaging, often using the terms "Digimarc Barcode for packages" and/or "Digimarc Barcode". Among other advantages, digital watermarking facilitates faster and more efficient checkout relative to traditional 1D barcode checkout. Digimarc recently publically announced a broad collaboration with GS1, a global leader in barcode management, to advance retail product identification through digital watermarking. In one Digimarc solution, a digital watermark signal can be printed on a retail package through selective modulation of the package's inherent design colors, or by adding additional ink to the package. In many cases the digital watermark signal is redundantly provided across the package surface, e.g., arranged in a tile-like pattern. That is, more than one instance of a digital watermark signal can be provided on a package surface. This avoids furiously rotating a package in search of a single 1D barcode on the package surface at checkout, since any package face can be read.

The majority of retail point-of-sale (POS) scanners currently have a narrow-band red LED, roughly with a peak illumination at or around 660 nm. We use the terms "at or around 660 nm" to mean a peak illumination within a range of 630 nm-710 nm. One example is a peak at 660 nm. Another example is a peak at 688 nm. Still another is a peak at 645 nm. Of course, many other peaks are intended to be included within this range. Additional details regarding red LED scanners can be found, e.g., in assignee's U.S. Pat. No. 9,380,186, which is hereby incorporated herein by reference in its entirety. We use the terms "machine-vision wavelength" in the present patent document to mean a color spectral wavelength at or around a wavelength (e.g., at or around 660 nm) at which an image capture device (e.g., a red LED scanner or smartphone camera) operates.

Color Selection

Not all colors are created equal in terms of ability to carry an encoded signal, particularly when the signal is to be optically captured by a traditional red LED (at or around 660 nm) scanner. Consider a design having original artwork that is lightly colored or includes open white spaces. To a red LED POS scanner, adding a color (e.g., black), which is visible (or distinguishable) to the red LED scanner, results in large visibility impact in the lightly colored or white design areas. In contrast, when considering a design having original artwork that is very dark or black to the red LED POS scanner, adding a color which is visible to the POS will not be distinguishable by the scanner over the dark original colors. See, e.g., U.S. Pat. No. 9,380,186 at FIG. 4 (color drawings are available in the '186 patent file) and Col. 13, line 58-Col. 14, line 12. To optimize detectability by a red LED scanner, digital watermark signals are most recognizable in colors which absorb light (or have low reflectance) in the red region of the spectrum (e.g., capable of being "seen" or "distinguished" by the red LED scanner), while colors with low absorption (or relatively higher reflectance) are not seen by a traditional retail red LED scanners. So color selection is important when designing packages so as to be favorable carriers for encoded signals including digital watermarking.

What is needed is an objective process to characterize a color's ability to carry or convey an encoded signal, e.g., in difficult environments such as primarily light-colored designs (e.g., including white or open spaces) and primarily dark-colored designs. In other words, we need to find which colors are suitable to add to artwork (or which colors to modify) that can be used to carry an encoded signal with a high robustness per unit visibility. So the following description in this Section III describes methods, apparatus, packages and systems for comparing encoded signal visibility and color error to the robustness of the encoded signal, which facilitates automated assistance for product packaging design, reducing cycle time and/or workflow impact, while improving visual quality of the product packaging design with more robust, reliable product identification.

One of our approaches determines total signal robustness per unit visibility. Remember that we are concerned with a particular machine-vision wavelength, e.g., at or around 660 nm. This machine-vision dependence can be evidenced by a relationship between the reflectance (R) at or around 660 nm of a target or particular color ($R660_{100\% \; color}$) at full printed color value (e.g., 100% ink) less the reflectance (R) of the substrate at or around 660 nm ($R660_{substrate}$). In fact, encoded signal robustness can be viewed as being proportional to, e.g.:

$$\Delta 660 = R660_{100\% \; color} - R660_{substrate}$$

Figures 20A, 20B:
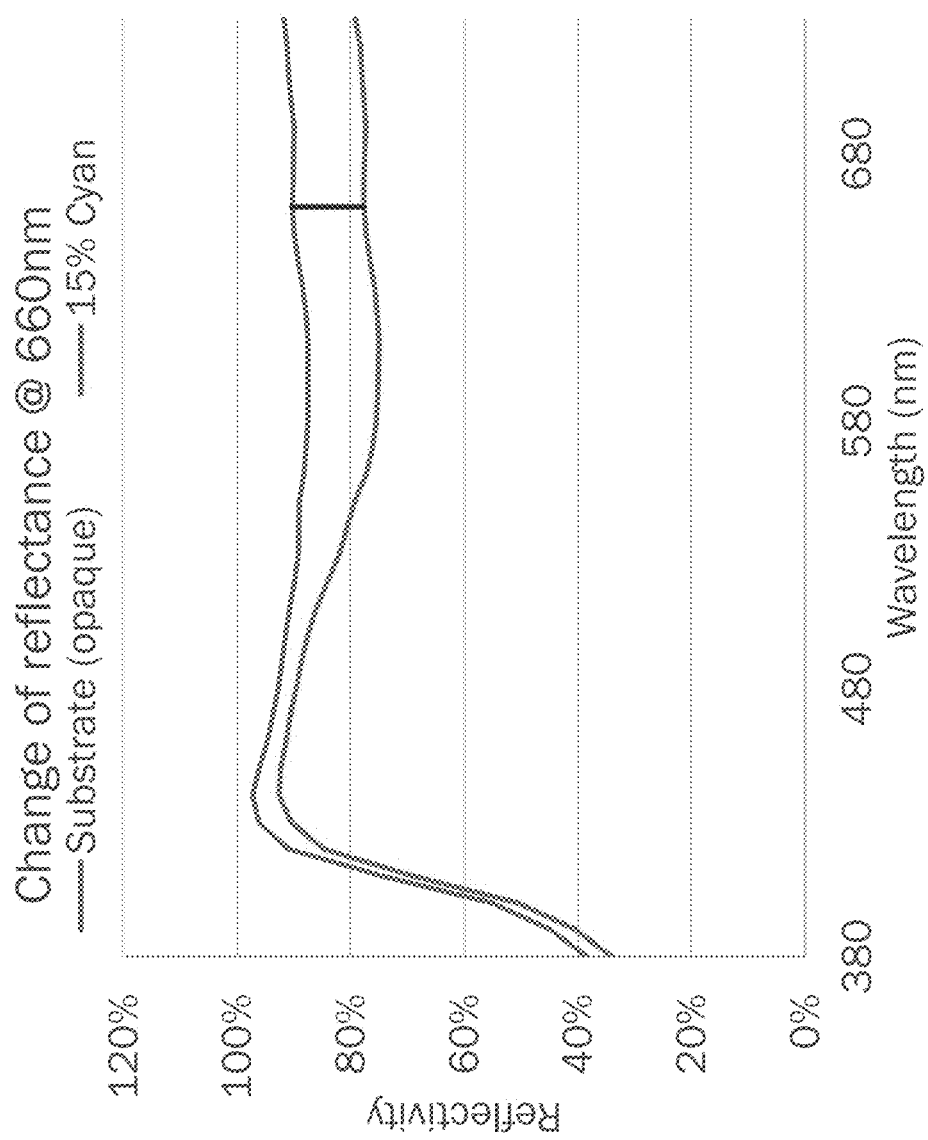
FIG. 20A is a graph showing reflectance differences across a color spectrum.
FIG. 20B shows an encoded patch, and white and Cyan patches.

To be sure, the absolute value of a target or particular color at or around a machine-vision wavelength isn't needed to predict the robustness of a signal carried by a target or particular color, since the difference between the substrate or background color (e.g., white or blue) and the target or particular color used to carry an encoded signal is preferred. For example, with reference to FIG. 20A, a reflectance difference (or $\Delta 660$) between a white substrate and 15% Cyan around 660 nm is illustrated. In the illustrated example, and as shown with an encoded signal patch in FIG. 20B, the difference between the white substrate (left lower box) and the 15% Cyan (right lower box), specifically around 660 nm, $\Delta 660$, is useful in evaluating colors. We have found that sufficient encoded signal reading can be had with a $\Delta R$ in the range of 8%-60+%. In the FIGS. 20A and 20B example, the reflectance difference between the substrate (or background) and the 15% Cyan is preferred to be in a range of 8%-60+%, which it is. More favorable results are had with a $\Delta R$ at or above 10%, e.g., in a range of 10%-20% or 10%-60%. We have found even more favorable results with a $\Delta R$ at or above 12%, e.g., in a range of 12%-20% or 12%-60%. Although higher $\Delta R$ values can result in signal visibility concerns or higher color errors, a detector will likely see these higher values even more pronouncedly.

Reflectance (R) can be quantitatively measured, e.g., using a spectrophotometer. Suitable devices are sold by, e.g., PCE Americas Inc., with offices at 711 Commerce Way Suite 8, Jupiter, Fla., USA, such as the Spectrophotometer PCE-CSM 10 or PCE-CSM 8. Other spectrophotometers are provided by, e.g., Konica Minolta Sensing Americas, Inc., with offices at 101 Williams Drive Ramsey, N.J., USA, such as the Spectrophotometer CM-5, and by, e.g., X-Rite Corp., with offices at 4300 44th St. SE, Grand Rapids Mich. USA, such as the RM200QC Imaging Spectrocolorimeter or X-Rite Pantone subsidiary's Pantone CAPSURE. Of course, other commercially available spectrophotometers can be used as well.

Once Δ660 is determined, we can establish a proportional relationship of Δ660 to a visibility error introduced into a design by a target color carrying an encoded signal. This visibility error can be classified by two (2) components: i) a color error, e.g., a color shift error or a color match visibility error (Ecm), and ii) encoded signal error, e.g., a texture error or an encoded signal visibility error (Ewm).

For the color match visibility error we can use:

$$Ecm = ((\Delta L^*)^2 + (\Delta a^*)^2 + (\Delta b^*)^2)^{\frac{1}{2}}$$

where, ΔL* is the luminance factor or lightness difference between 100% of the ink and the substrate, Δa* represents a relationship between the 'a' channel color values of the target or particular color ($a_{color}$) and the 'a' channel color values of the substrate ($a_{sub}$) [e.g., $a_{color}-a_{sub}$], and Δb* represents a relationship between the 'b' channel color values of the target or particular color ($b_{color}$) and the 'b' channel color values of the substrate ($b_{sub}$) [e.g., $b_{color}-b_{sub}$]. For the encoded signal visibility error we can use:

$$Ewm = \left((\Delta L^*)^2 + \left(\frac{\Delta a^*}{8}\right)^2 + \left(\frac{\Delta b^*}{16}\right)^2\right)^{\frac{1}{2}}$$

Figure 15C:
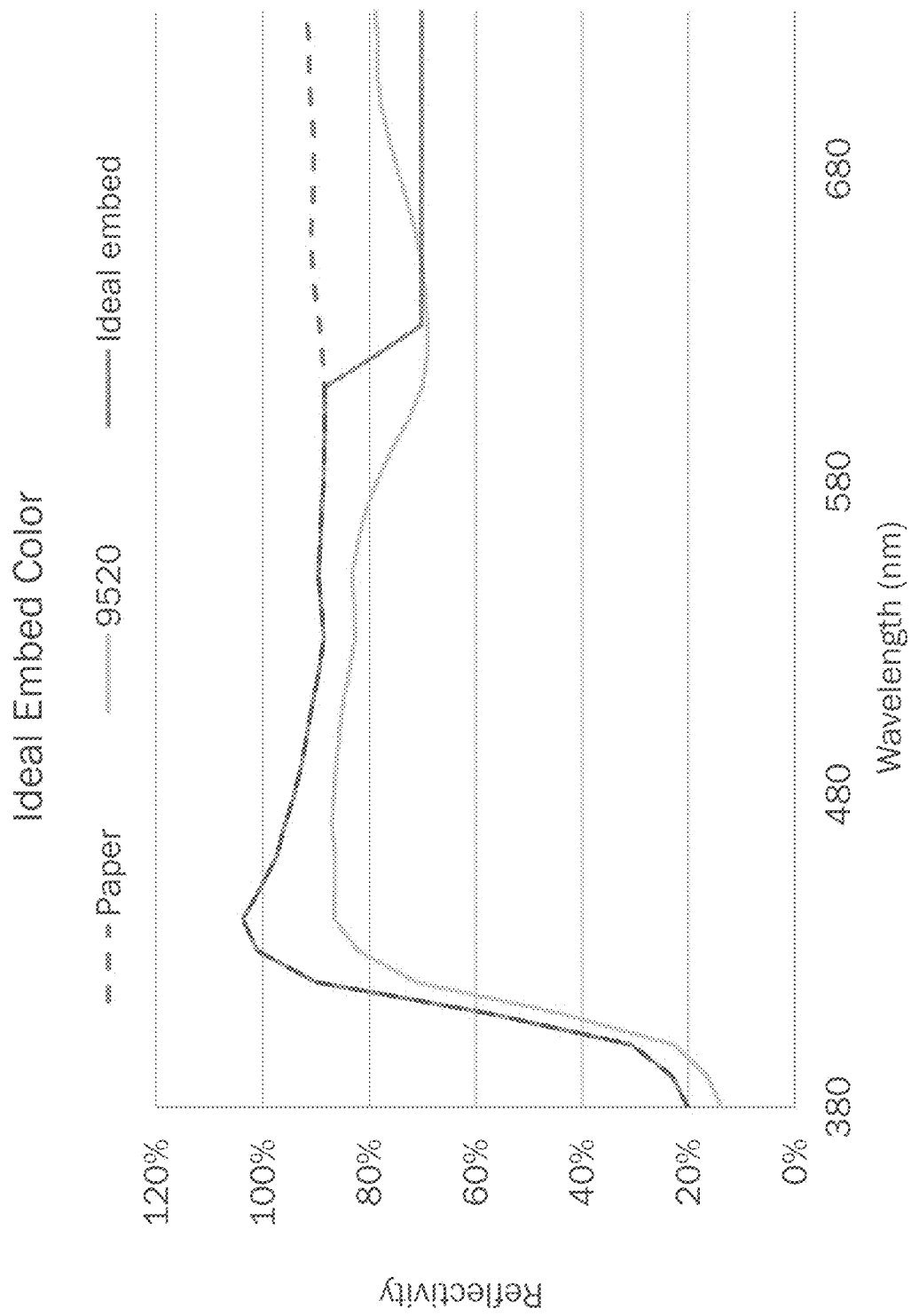
FIG. 15C shows reflectance curves for Paper White C, Pantone 9520 C and an "ideal" (but hypothetical) embedding color.
Figure 15D:
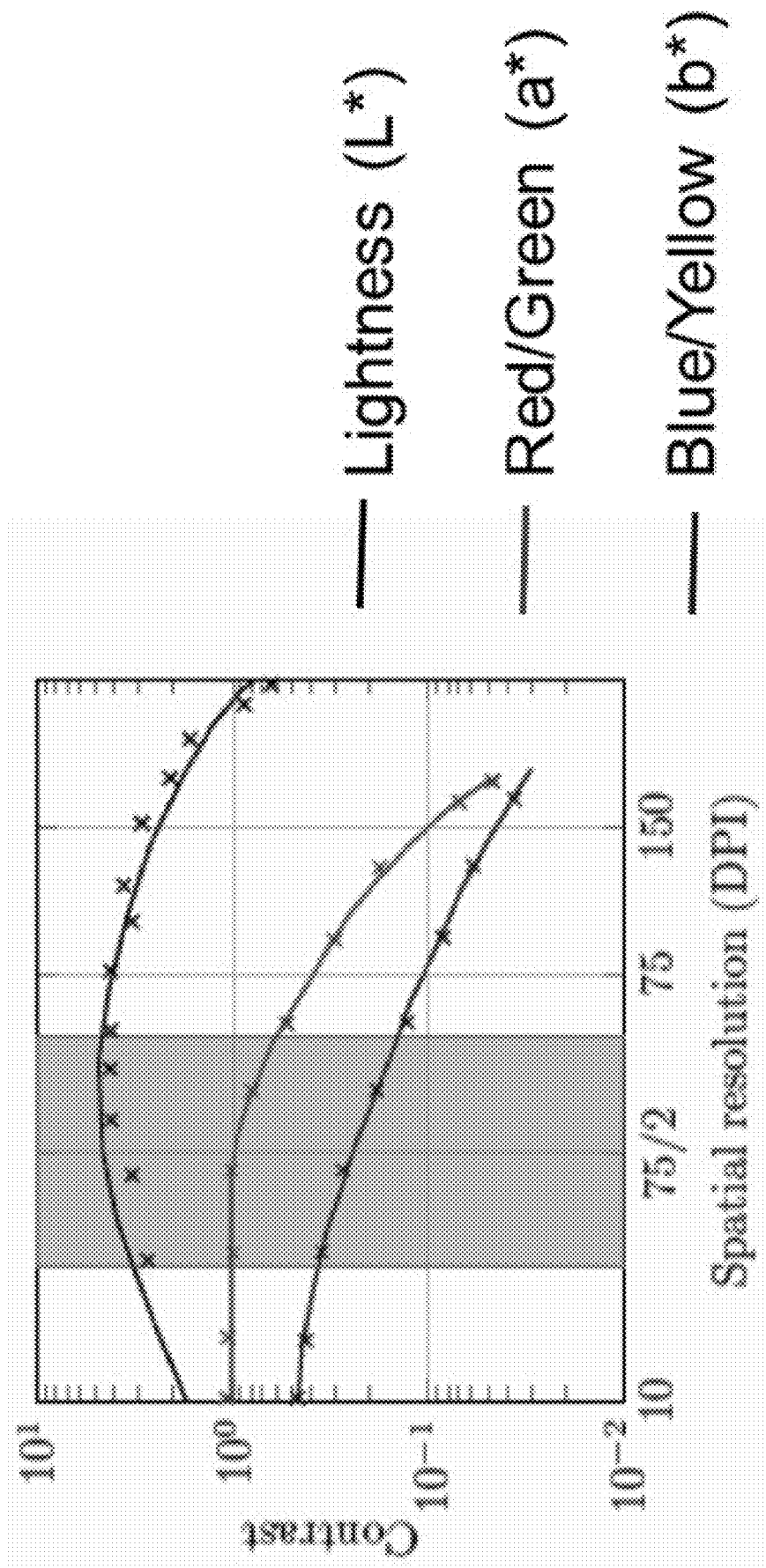
FIG. 15D shows a Contrast Sensitivity Function (CSF) for the Human Eye.

To even better understand the encoded signal visibility error please consider an example where an encoded signal, e.g., a sparse mark, includes relatively more signal energy over the spatial resolutions shown by the gray box in FIG. 15D. If the luminance and chrominance Contrast Sensitivity Functions (CSFs) are integrated over this gray box region, the resultant energy ratios approximate the relative weights that can be applied to CIE L*(e.g., 1), a* (e.g., 8) and b* (e.g., 16) to determine Ewm. Additional information regarding CSF's can be found, e.g., in F. L. van Nes and M. A. Bouman, 'Spatial modulation transfer in the human eye', Journal of Optical Society of America, 57(3):401-406, March 1967; and G. J. van der Horst and M. A. Bouman, 'Spatiotemporal chromaticity discrimination', Journal of Optical Society of America, 59, 1969, which are each hereby incorporated herein by reference.

So let's now look at these two errors with respect to a spectral dependency at a given machine-vision wavelength, e.g., at or around 660 nm. One such relationship includes, e.g.:

$$RWV = \frac{\Delta 660}{\left((\Delta L^*)^2 + \left(\frac{\Delta a^*}{8}\right)^2 + \left(\frac{\Delta b^*}{16}\right)^2\right)^{\frac{1}{2}}}$$

In the above equation, RWV represents a proportional encoded signal error or "robustness per unit watermark visibility" at a given machine-vision wavelength, ΔL* represents a relationship of lightness of the target or particular color ($L_{color}$) and lightness of the Substrate ($L_{sub}$) [e.g., $L_{color}-L_{sub}$], Δa* represents a relationship between the 'a' channel color values of the target or particular color ($a_{color}$) and the 'a' channel color values of the substrate ($a_{sub}$) [e.g., $a_{color}-a_{sub}$], and Δb* represents a relationship between the 'b' channel color values of the target or particular color ($b_{color}$) and the 'b' channel color values of the substrate ($b_{sub}$) [e.g., $b_{color}-b_{sub}$]. For example, the substrate may include a white substrate or other colored substrate. As discussed above, the denominator term generally represents an error due to an encoded signal "texture" or an introduced signal error when conveyed by the target or particular color. CIE L*, a* and b* can be measured values, or previously determined values relative, e.g., to a particular substrate.

Next we evaluate robustness per unit color match visibility. This feature can be generalized as being proportion to the color error at a machine-vision wavelength, e.g., at or around 660 nm, associated with the target or particular color. ΔL*, Δa* and Δb*, below, have the same relationships as in the above RWV relationship. RCV represents one example of a proportional color error.

$$RCV = \frac{\Delta 660}{((\Delta L^*)^2 + (\Delta a^*)^2 + (\Delta b^*)^2)^{\frac{1}{2}}}$$

If color error and encoded signal error have equal importance, then the total signal robustness per unit visibility (RPV) can be determined by combining RWV and RCV, e.g.:

$$RPV=RWV+RCV$$

In some cases, we weight RWV and RCV to emphasize or deemphasize the encoded signal error or color error, if one is relatively more important than the other. For example, RPV=0.7RWV+0.3RCV, or RPV=0.25RWV+0.75RCV.

FIG. 15A shows various colors and their corresponding "Digimarc Barcode Score" or abbreviated as "DB Score". In FIG. 15A we evaluated so-called Pantone "C" colors, which refers to colors printed on a coated substrate. (Pantone "U" colors refers to colors printed on an uncoated substrate. Of course, our scoring techniques would apply well to colors printed on an uncoated substrate as well.) The ink and substrate reflectance values were also measured, but could be substituted from published CIELAB values. The DB Score is associated with the color's RPV value by normalizing values so that the highest robustness per unit visibility value is assigned a score of 100, and the next highest RPV score is assigned a 96, and so on. Of course, other normalizing schemes could be used, e.g., on a 0-1.0 scale or a percentage, etc. In FIG. 15A, colors are sorted from highest to lowest in DB scores. The DB Score reflects a per-ink measure of encoded signal robustness per unit visibility. A high DB Score suggests stronger scanner performance with low visibility relative to a lower DB Score. In more general terms, the DB Score estimates a suitability of an ink (or target color or particular color) for use in printed packaging applications and other image capture scenarios including a specific dominant detection color channel (e.g., red LED scanner). For the Δ660 values used in FIG. 15A, we used reflectance at approximately 660 nm. Of course, we could vary this capture wavelength to anywhere at or around 660 nm, or aimed at a particular capture device (e.g., tuned to a particular LED scanner like a 640 nm or 688 nm peak scanner).

The color commonly referred to as "Pantone 9520 C" was determined to have the highest DB Score out of the colors tested relative to a Paper White C substrate. Measured values and determined RPV and DB Score are shown in Table 1, below:

TABLE 1

Color Values and DB Score for Paper White C and Pantone 9520 C

| Color Name | CIELAB_L | CIELAB_a | CIELAB_b | RPV | DB Score |
|---|---|---|---|---|---|
| Paper White C | 95.8 | 1.11 | −5.41 | 0.06824 | 100 |
| Pantone 9520 C | 91.54 | −6.82 | −3.6 | | |

Of course, instead of using measured values, Pantone 9520 C and other colors can be estimated by predetermined values. For example, CIELAB color space values, e.g.: CIELAB 92-90 for Pantone 9520 C. (Pantone 9520 U can be estimated by the following color values, e.g.: CIELAB 92-170). Pantone colors and Paper White C can also be estimated or represented with standardized color values, e.g., provided in PhotoShop or from PANTONE's own products (e.g., PantoneLive).

FIG. 15B shows color curves for Paper White C and Pantone 9520 C in terms of reflectance and wavelength. And, as seen in FIG. 15C, Pantone 9520 C is a good substitute for what a more ideal (but hypothetical) embedding color might look like in terms of reflectance. If a sparse mark is placed directly on a white substrate, of the four process colors Cyan (C), Magenta (M), Yellow (Y), and Black (K), only Cyan and Black would been seen by a traditional red LED scanner. Both C and K absorb some light at or around 660 nm. An ideal embedding color would have a spectrum very close to the spectrum of the substrate, yet it would absorb some percentage of light at or around 660 nm. A difference from the background color at or around this wavelength is preferable in order for it to be seen by a traditional red LED scanner.

One value in terms of visibility associated with selecting a high DB Score color is shown in FIG. 16. Using a color like black to carry an encoded signal (e.g., a sparse mark in FIG. 16) is highly visible to a machine-vision system, e.g., a red LED scanner. However, using black ink over a lightly colored background, e.g., Paper White C, creates a highly visible pattern to a human visual system (HVS). In contrast, using a color determined through the RPV selection process, e.g., Pantone 9520 C, for use over a lightly colored background, e.g., Paper White C, creates a robust machine-readable signal at or around 660 nm that is relatively less visible to the Human Visual System (HVS) compared to black, cyan and other colors.

The above RPV color selection process is not limited to a certain substrate or background color or a particular machine-vision wavelength. In many cases a design will have dark colors, e.g., Pantone Blue 0821 C. A sparse mark or other encoded signal may be provided over the dark color. A color can be selected to carry an encoded signal. For example, using the above RPV selection process, Pantone 333 C was selected as a favorable candidate. Measured values and a determined RPV and DB Score are shown in Table 2, below:

TABLE 2

Color Values and DB Score for blue background and Pantone 333 C

| Color Name | CIELAB_L | CIELAB_a | CIELAB_b | RPV | DB Score |
|---|---|---|---|---|---|
| Pantone Blue 0821C | 76.54 | −23.5 | −26.42 | 0.05574 | 100 |
| Pantone 333 C | 77.06 | −45.98 | −5.17 | | |

FIG. 17 shows color curves for Pantone Blue 0821 C and Pantone 333 C in terms of reflectance and wavelength. Of course, instead of using measured values, color values could be estimated with standardized color values, e.g., provided in PhotoShop or from one of PANTONE's own products, e.g., PANTONE LIVE. (The Table 2 example assumes that the overprinting ink (the lighter Pantone 333 C) is opaque. The RPV and DB Score determination would need to be modified for transparent/semi-transparent inks with an ink blend model, e.g., by multiplying the two inks or color values.) The circled area in FIG. 17 shows a reflectance separation between the two colors, ΔR>12%, which should be sufficient to distinguish between an encoded signal (carried by Pantone 333 C) and the background (Pantone Blue 0821C).

Figure 27A:
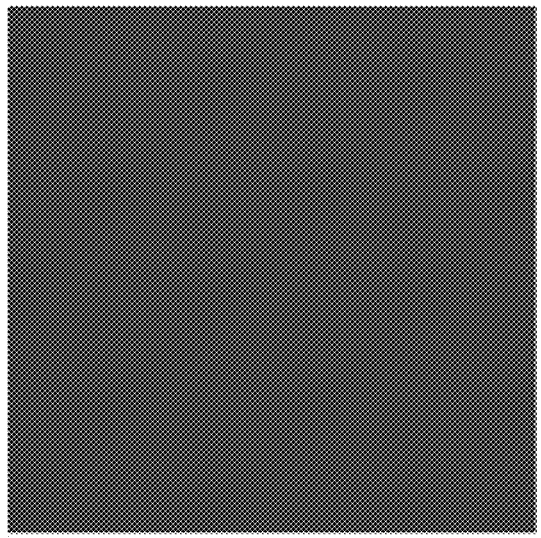
FIG. 27A shows a color patch for Pantone 438 C.

Another implementation is discussed relative to FIG. 27A-FIG. 29. Retail product packages and other printed objects (e.g., documents, substrates, product hang tags, etc.) that include areas of ink or color having low reflectivity at or around 660 nm (e.g., generally darker colors) are difficult to encode, since they appear as a solid black to a red LED scanner. See, e.g., U.S. Pat. No. 9,380,186 at FIG. 4 (color drawings are available in the '186 patent file) and Col. 13, line 58-Col. 14, line 12. Such a low reflectivity color will be called a "background color" for the following discussion. FIG. 27A shows an example of a background color, Pantone ("PMS") 438 C.

Figure 27B:
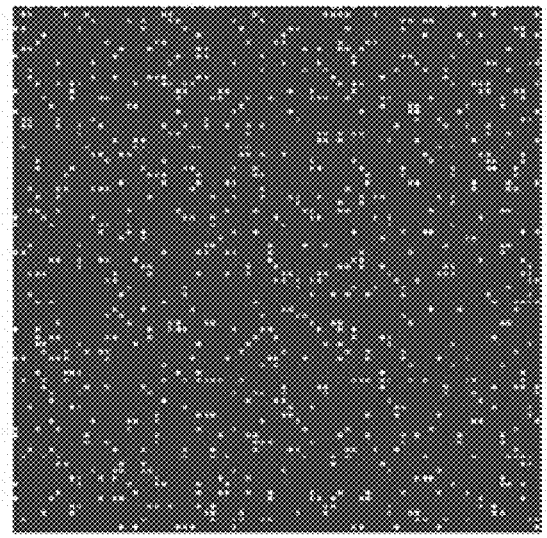
FIG. 27B shows a color patch for Pantone 438 C, plus an encoded pattern allowing a white substrate to be visible at pattern spatial locations.

One solution to this low reflectivity encoding problem is to punch "holes" in the background color, e.g., following a sparse mark pattern. Using the term "holes" does not limit signal elements to round or oval elements. Indeed, a hole's shape can be patterned according to other element shapes intended to carry a signal. For example, see the pattern elements in FIGS. 6, 7, 13, 14 and/or 16. The spatial locations corresponding to the holes do not include any background color ink. The sparse mark pattern in the punched background is noticeably visible, e.g., as shown in FIG. 27B, when printed on a white substrate. The white substrate shows through at hole locations and has high reflectivity at or around 660 nm. See, e.g., the paper reflectance graphs in FIGS. 15B and 15C. Thus, there will be a reflectance difference detectable at or around 660 nm between the background color (Pantone 438 C) and the white substrate. (Like as discussed above, a sparse mark can be inverted prior to, e.g., guiding hole punching to accommodate the light pattern on dark background approach. Then, no changes need to be made to the detection of the sparse mark.)

While the above hole punching solution results in a robustly detectable signal, it produces an encoded printed area system (FIG. 27B) having high visibility to the human visual system (HVS). To reduce signal visibility, the holes can be filled or printed over with an ink color which is visible to an image capture device (e.g., a red LED scanner or smartphone camera), but includes relatively lower perceptibility to the HVS. The DB Score processes discussed above, with slight modifications, can be used to select a filler ink. For example, the methods and processes used to select a best ink to encode a white substrate can be used, e.g., with the following changes:
1. Encoded signal pattern is inverted, e.g., since reflectivity of holes at or around 660 nm is higher than the background color, in contrast to the original method in which a sparse mark pattern is darker relative to a white substrate; and
2. Perceptual difference is calculated relative to the background color, instead of a white substrate.

Figure 27D:
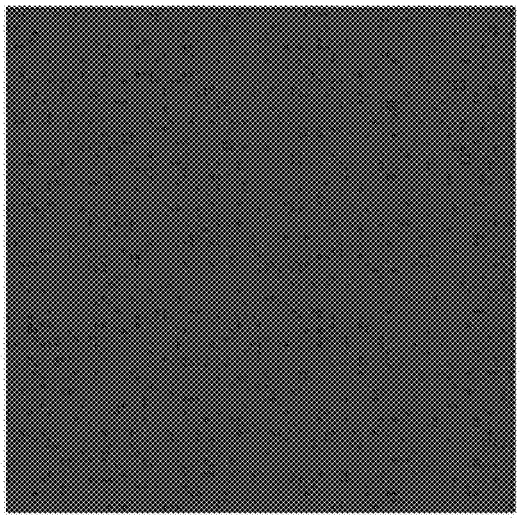
FIG. 27C shows a color patch for Pantone 2356 C.
FIG. 27 D shows the FIG. 27B color patch with its encoded pattern filled in or printed over with the color shown in FIG. 27C.
Figure 27C:
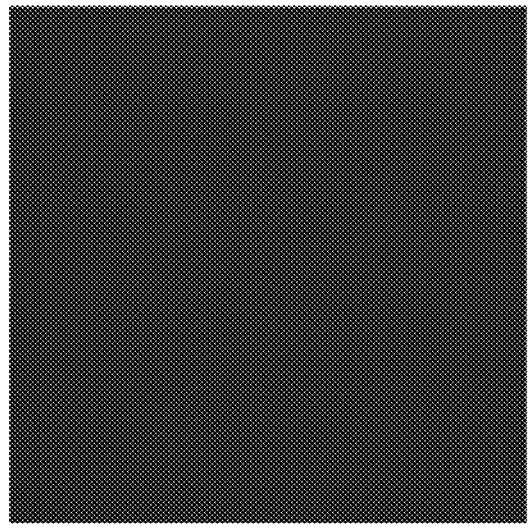

As an example, Pantone 2356 C can be selected as a filler ink (FIG. 27C). The filler ink is used to fill in the spatial locations corresponding to the holes. That is, for example, the filler ink can be printed at hole locations, covering the white substrate (FIG. 27D). The resulting HVS visibility is much improved relative to the white substrate hole background. And, using the above DB Score processes, as modified, Pantone 2356 C is the "best" ink to use for a background Pantone 438 C in terms of encoded signal robustness and visibility. In some cases even better visibility results may occur when a selected filler ink print field extends beyond hole boundaries. For example, the filler ink may overprint the background ink by 1-6 pixels past the boundary.

Figure 28:
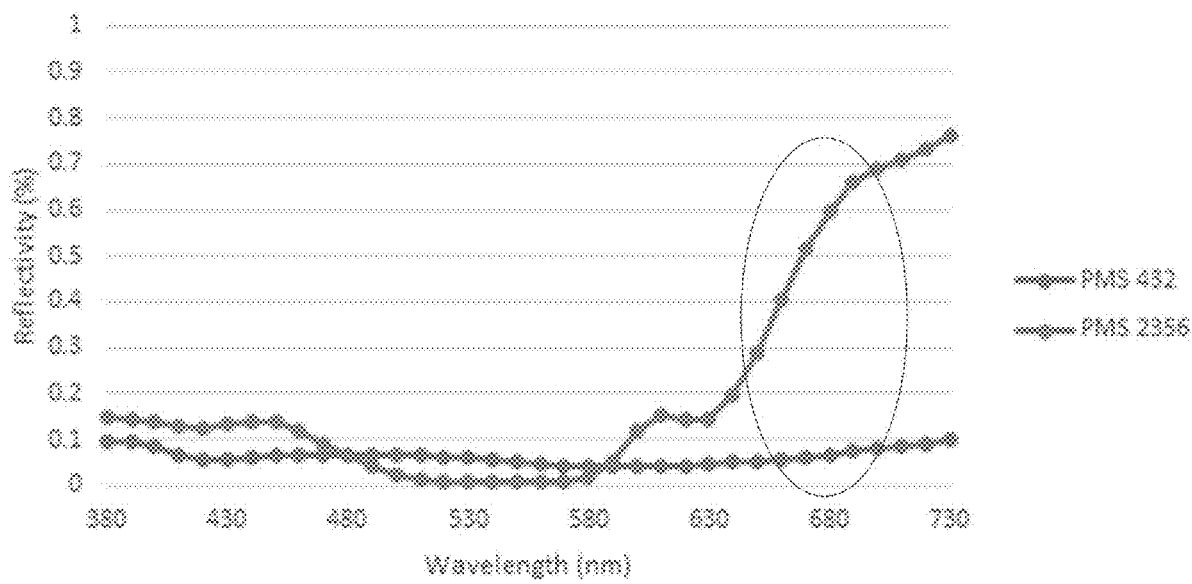
FIG. 28 shows reflectance curves for Pantone 432 C and Pantone 2356 C.

FIG. 28 shows reflectance graphs for a low reflectance background color and a selected fill color. In this example, the background color is Pantone 432 C and selected fill color is Pantone 2356 C. The red circle shows that there is a good reflectance difference (e.g., ΔR>8-60%, e.g., preferably at least >12%) between the two inks at or around 660 nm. (In fact, this fill color Pantone 2356 C would be a good choice for many background colors having low reflectivity.) Corresponding CIELAB LAB reference values, RPV and DB Score are shown in Table 3, below:

TABLE 3

Reference Color Values and DB Score for Pantone 432 C (background) and Pantone 2356 C (filler)

| Color Name | CIELAB_L | CIELAB_a | CIELAB_b | RPV | DB Score |
| --- | --- | --- | --- | --- | --- |
| Pantone 432 C | 27 | −4 | −6 | .054 | 100 |
| Pantone 2356 C | 27 | 53 | −22 | | |

Figure 29:
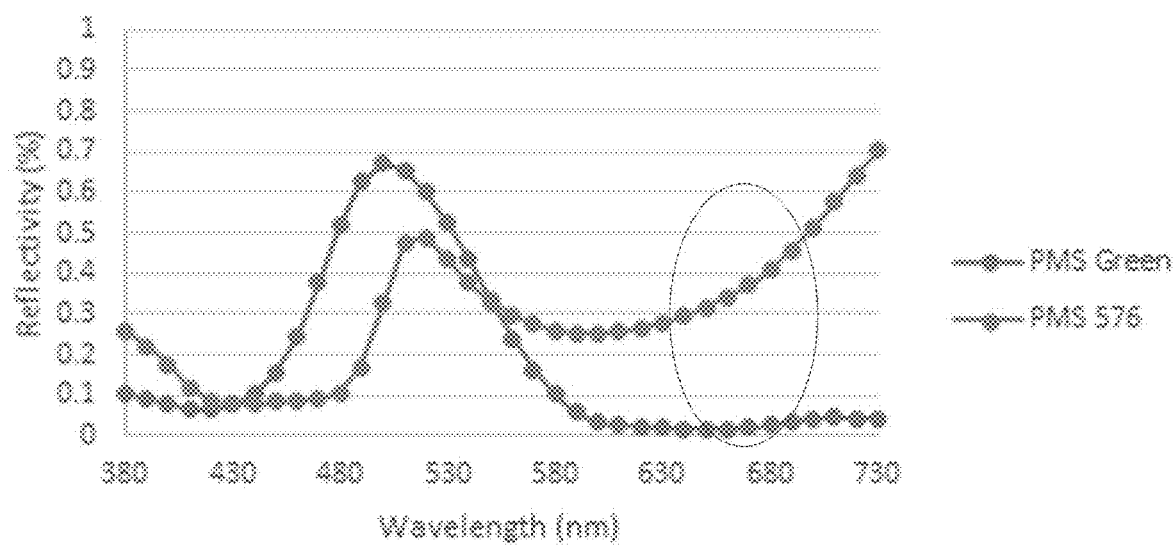
FIG. 29 shows reflectance curves for Pantone Green C and Pantone 576 C.

FIG. 29 shows another implementation. Here, a background color of Pantone Green C has higher lightness compared to, e.g., Pantone 438 C, but still has a low reflectivity at or around 660 nm. A red LED scanner would see Pantone Green C as black. The same DB Score process discussed above with respect to FIGS. 27A-27D and 28 and Table 3 can be used to select a best hole filler color, in terms of DB Score, which turns out to be Pantone 576 C. The red circle shows that there is an acceptably discernable spectral reflectance difference (e.g., ΔR>8-70%, e.g., >12%) between the background color and hole filler color at or around 660 nm. Such a reflectance difference will allow a detection process discern between signal carrying components.

Figure 30:
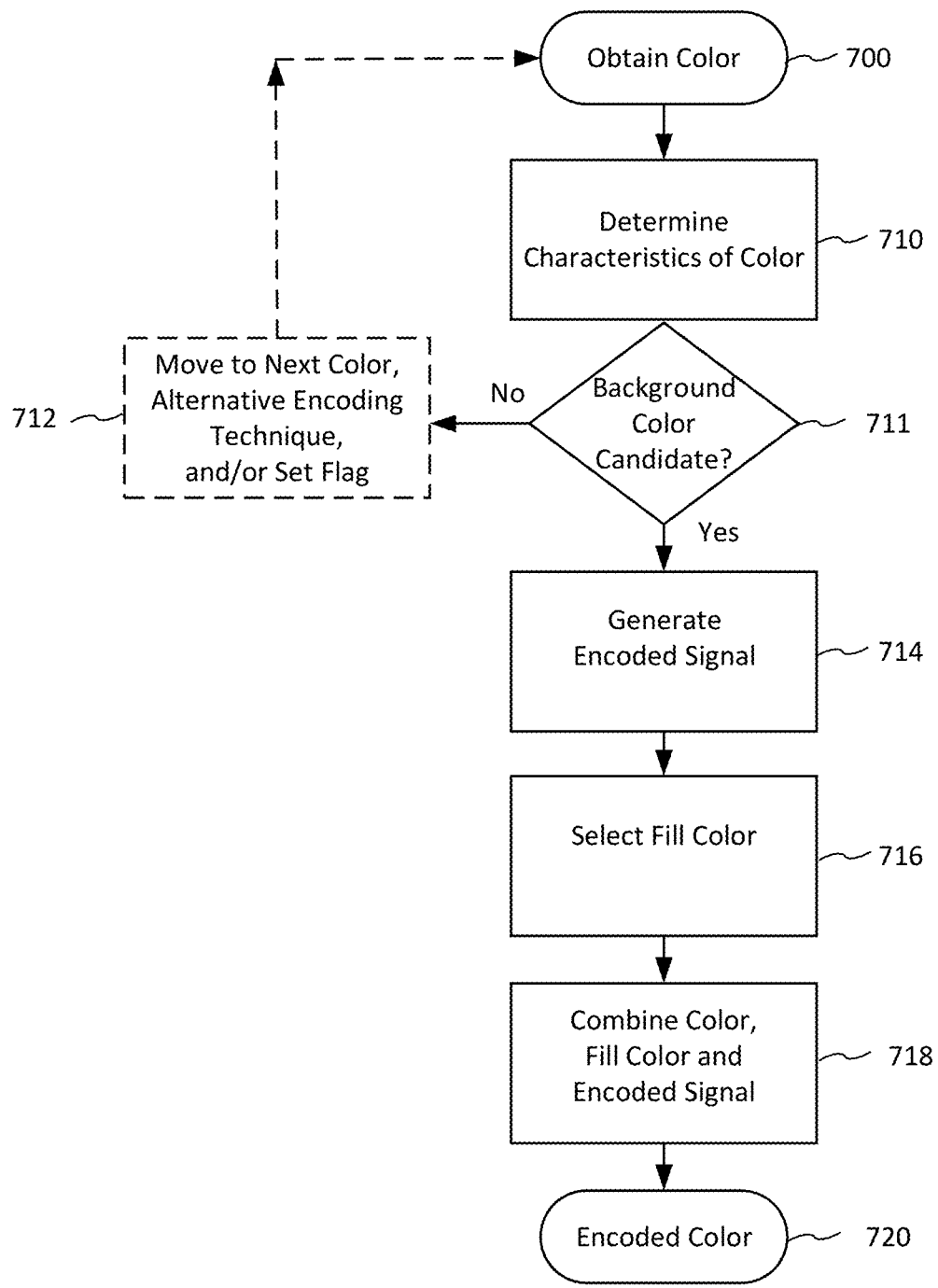
FIG. 30 is a flow diagram for a process to encode dark color/ink areas.

FIG. 30 is a flow diagram to aid discussion of one embodiment of an ink selection and encoding process for dark color areas, e.g., for a retail product package or other printed object (e.g., documents, substrates, product hang tags, etc.). The processes discussed in FIG. 30 can be implemented using the systems and apparatus discussed below in section IV.

Referring to FIG. 30, a color 700 is obtained, e.g., from a design file such as presented in a PDF or Adobe Illustrator/Photoshop file or in an ESKO packaging software format. The design file can contain many colors, or a single color 700. Alternatively, color 700 can be accessed from a remote location over a network. Color characteristics for color 700 are determined 710. For example, a color name (Pantone number or name), LAB values, RGB values, etc. Using the color's characteristics, it is determined 711 whether color 700 is a background color candidate. For example, the color's 700 corresponding reflectance values at or around a machine-vision wavelength (e.g., at or around 660 nm) can be used to determine whether color 700 falls into a predetermined class or level of low reflectance colors (e.g., such as Pantone 432 C, Pantone 438 C, or Pantone Green C). Or a threshold reflectivity at a machine-vision wavelength, e.g., 8-15% or less, such as 8% or less, 10% or less, 12% or less, 15% or less) can be used to determine a background color. Or, a set or all Pantone colors can be pre-analyzed to determine whether they are considered background colors. Color 700 can be referenced against the pre-analyzed set or all Pantone colors to determine whether it is a background color. If it is a background color, an encoded signal is generated 714. The signal may include, e.g., a spark mark, continuous mark or other encoded format. The signal may be combined with color 700 at this point, e.g., resulting in an encoded color such as shown in FIG. 27B. Or, the encoded signal pattern may be stored for further use. If color is not a background color, flow passes to determine 712 an alternative embedding method, or other colors (e.g., in the design file) can be evaluated to determine whether they are background candidates. Alternatively, a flag can be set to encourage manual review of the color to determine an encoding technique. A hole filler color is determined 716. For example, the RVP/DB Score methods and processes, as modified for background colors above in steps 1 and 2, can be used. Once a hole fill color is determined, the color 700, fill color and encoded signal can be combined, e.g., back in the design file. They can be separate layers, or the encoded signal pattern can be used in the color 700 layer and the hole fill layer as a mask, e.g., creating openings/holes in the color 700 layer and indicating corresponding print locations in the hole fill color. For example, the encoded signal can be used as a mask to create spatial hole locations in color 700. Or, it can be used to create an Illustrator/Photoshop, PDF, ESKO or other design file layer for the fill color, where the fill color is to be printed at the hole locations. As an alternative, color 700, fill color and encoded signal information can be provided for use in a print RIP process, where the encoding is introduced to color 700 as part of or prior to the print process. An encoded color 720 results. The encoded color 720 may be used to guide printing of, e.g., a graphic design, on packaging, label, tag, substrate, etc. For example, the encoded color 720 may be placed in a design format that is provided to a printer. The design file is used to help create a printing plate for an offset press. Or the design file is used to guide, e.g., a digital press.

While we have focused on selecting a single hole filler color in some of the above implementations, our inventive processes are not so limited. Instead of using a single color, a combination of ink colors can be selected by evaluating overprint spectra for ink combinations. For example, color patches printed to create CMYK or ECG color profiles can be used to find the best overprint hole fill color combination for a particular background color. The overprinted spectra would be evaluated in a DB Score process instead of, or in connection with, signal color fillers.

Our RPV color selection process can be implemented in a variety of ways. A first approach determines DB Scores for a plurality of background and/or substrate colors using measured or standard color and reflectance values. The resulting DB Scores are compiled in a database, memory or table for access when needed. For example, a designer may look to the DB Scores when selecting a color to carry a digital watermark signal or other encoded signal relative to a desired background and/or design colors.

A second approach determines DB Scores in real time, using colors provided, e.g., in a design file or by a designer. In this approach, the RPV color selection process can codified in an application plug-in, provided as an application feature or accessed remotely as a cloud service or server function. A design file may include a variety of different colors, e.g., 6-10 colors. For background and solid colors areas, the RPV color selection process can be invoked to select suitable colors to carry or convey an encoded signal. In some implementations, a user may limit the search of possible colors to those already present in the design file. For example, the 6-10 design colors can be evaluated, e.g., in terms of their DB Scores relative to an intended background, substrate or solid color area. The one or two highest DB Scores can be evaluated to carry or convey an encoded signal, e.g., such as a sparse or continuous mark. In a related implementation, given a background or solid color area, prior to running a DB Score, a subset of all possible colors is determined. For example, the subset may include those colors within a certain color distance from the background or solid color area. "Certain" in this case can be established, e.g., based on "just noticeable difference" metrics like 0-1.5 $\Delta E$ (color error).

The DB Score described above includes a robustness and a visibility component. The robustness component can be obtained, e.g., from a difference between paper and ink spectral responses at 660 nm. The visibility component is based on ink values, e.g., CIELAB values, and can be tested using, e.g., an Epson Stylus 4900 ink jet proofer.

In another example, a printed fan book can be produced which includes a DB Score together with Pantone colors so that a designer may visualize the effect of watermarking a spot color. For example, a solid PANTONE spot color is compared to a watermarked version of the spot color.

However, since a physical book with a large range of spot colors would be expensive to produce, we could simulate spot colors using Pantone Extended Color Gamut (ECG) printing. PANTONE ECG has a large gamut which covers 90% of PANTONE spot colors while allowing a total maximum ink coverage of 257% for any given color if required. A Pantone certified printer can be used since accurate CIELAB values are required for faithful representation of the visibility of the watermarked samples. Also conventional screening will be used for it to be representative of commercial printing.

We have found that our DB Score accurately predicts a suitable color (often the relatively best color for a given set of colors) to use for a sparse mark, e.g., for white and lightly colored areas of a design. The visibility component of the DB Score can be used to quantify sparse mark visibility for a designer. Initial testing shows that the DB Score also works with a single channel continuous tone watermark.

To prove out our DB Score, a psychophysical test was conducted on a range of ink colors to measure subjective visibility. These subjective tests were conducted on a range of ink colors which were selected to cover a wide range of color match and watermark visibilities. The correlation between the subjective tests and the objective DB was then determined. To ensure accurate CIELAB values were being used in the objective DB Score determination, solid patches of all the test colors were printed and measured.

Figure 23D:
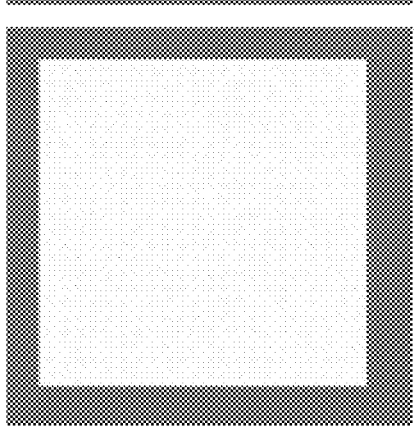
FIGS. 23A-23D collective represent a quality ruler increasing in ink amount percentage from FIG. 23A (slight) to FIG. 23D (strong).
Figure 23C:
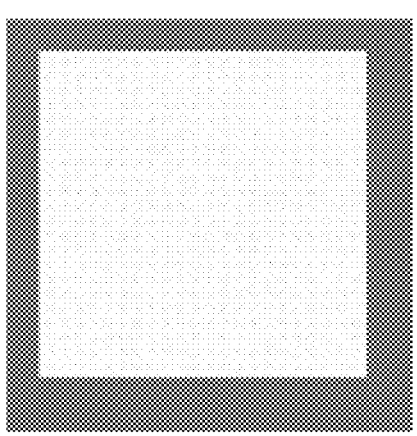
Figure 23B:
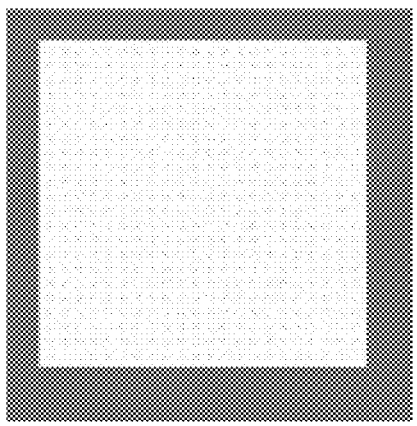
Figure 23A:
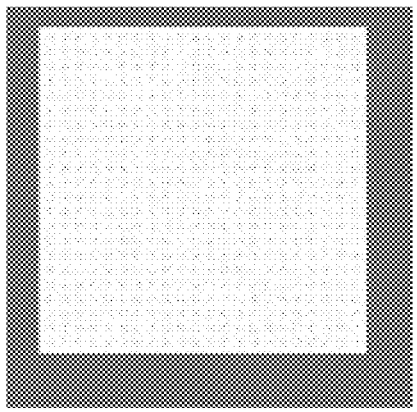

A set of twelve (12) human observers were asked to rate their perception of image degradation of twelve (12) color sparse mark patch samples using a quality ruler. The quality ruler is shown in FIGS. 23A-23D and includes a sparse mark that increases in signal strength from left (FIG. 23A) to right (FIG. 23D). The quality ruler was made with black ink and the percentages of black ink used in the sparse mark were chosen to have equal lightness increments, so that the watermark visibility increments between FIG. 23A (5% black), FIG. 23B (10% black), FIG. 23C (15% black) and FIG. 23D (20% black) are approximately equal. The sparse mark spatial pattern remained the same between FIGS. 23A-23D.

Figure 25:
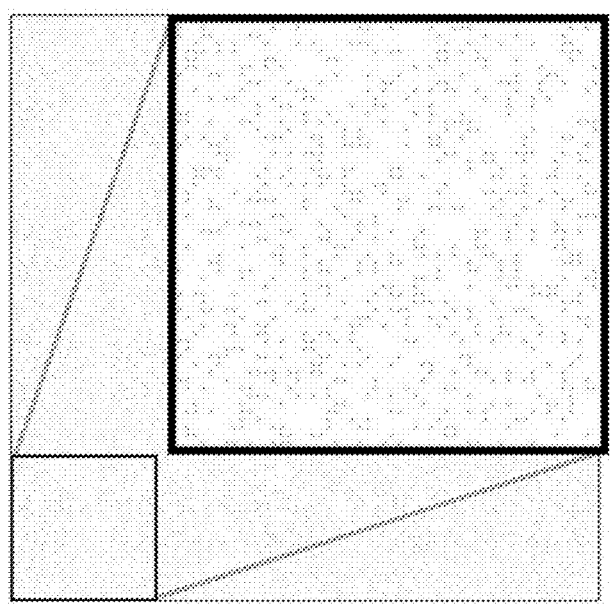
FIG. 25 shows an expanded example of one of the sparse mark patches shown in FIG. 24.
Figure 24:
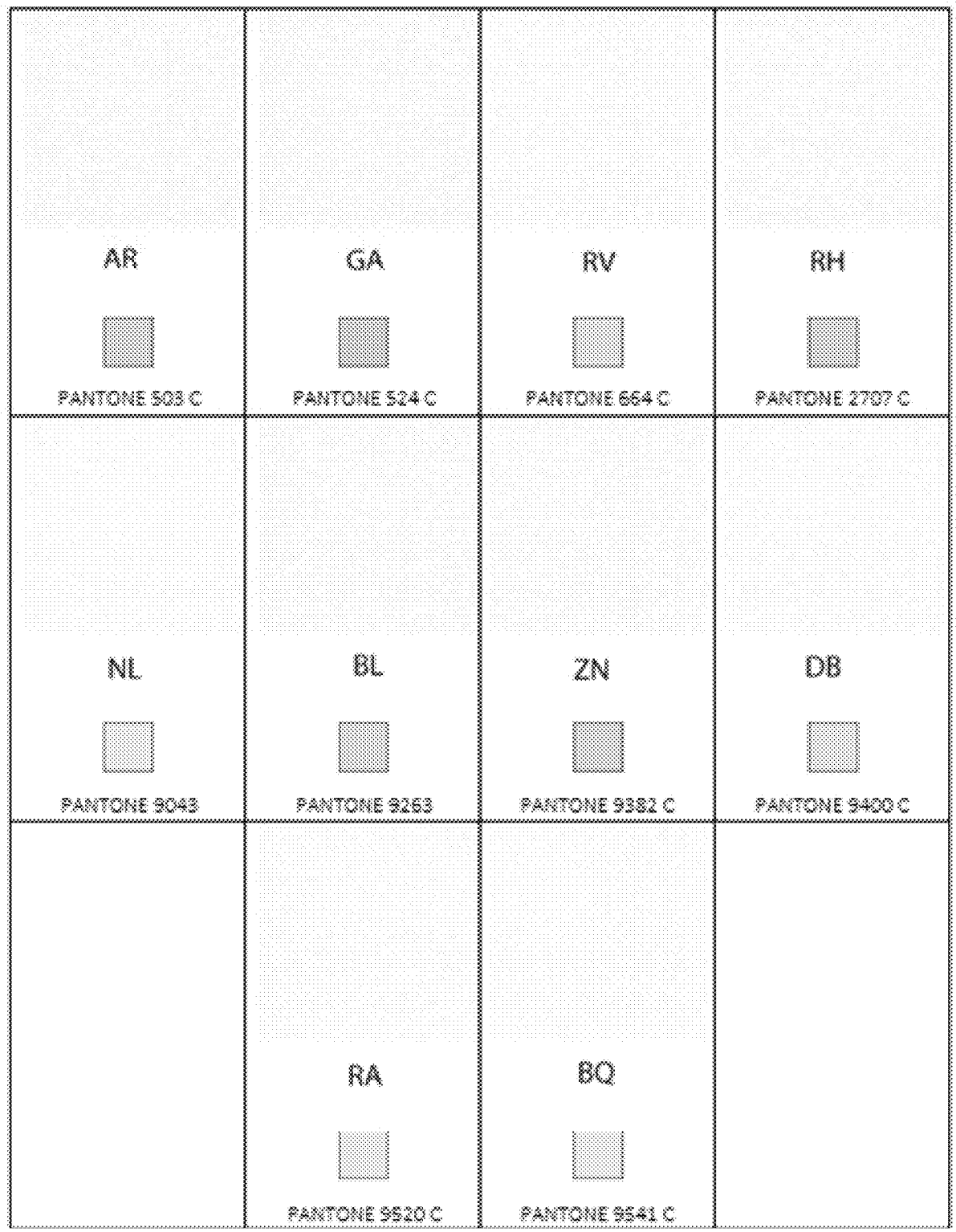
FIG. 24 includes 10 test sparse mark patch samples, with a solid version of each color along with a corresponding Pantone number.

The twelve (12) color sparse mark patch samples were shown one at a time to each of the 12 test observers. An enlarged patch sample is illustrated in FIG. 25. Thumbnails of 10 of the 12 color sparse mark patch samples are shown in FIG. 24, along with a corresponding solid color patch for each Pantone color. We assigned lettering (e.g., AR or ZN) to identify each of the patches. Two (2) of the twelve (12) Pantone patch samples in the subjective visibility testing were repeats. Sample BL was the same as EA, and sample ZN was the same as LY. Thus, EA and LY are not shown in FIG. 24. The sparse mark spatial pattern was the same in each of the samples, and each was printed using 100% of its corresponding color ink. The Pantone colors were chosen to be approximately equally spaced in visibility across the quality ruler samples. The patch samples and the quality ruler samples were all printed with an Epson Stylus 4900 on GMG semimatte 250 proof paper using the GMG Color-Proof RIP. The test observers only saw the sparse mark patch samples, and not the solid color or corresponding Pantone number.

Figure 26A:
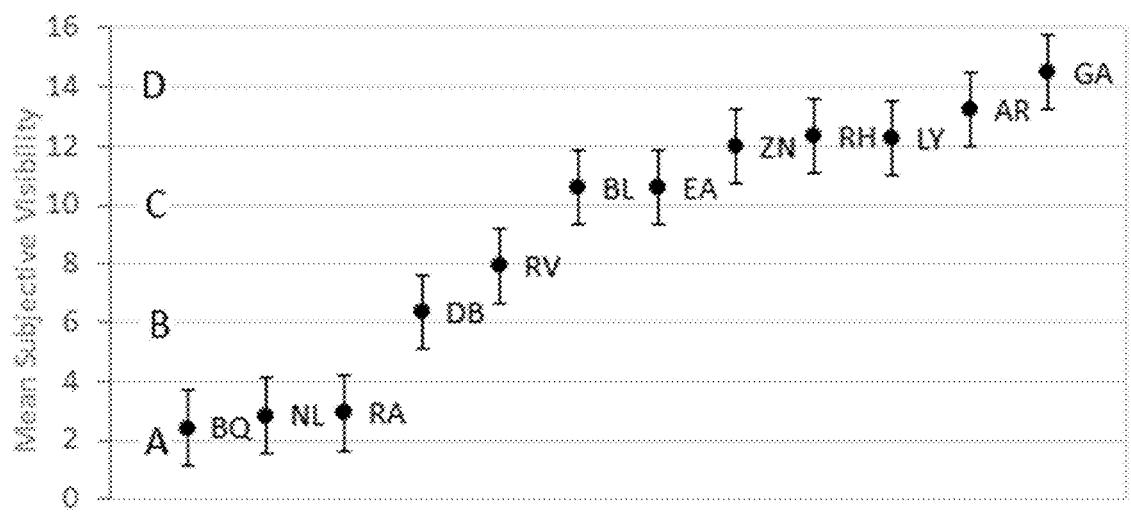
FIG. 26A shows a plotting of mean subjective visibility testing of the sparse mark patch samples shown in FIG. 24.

The patch samples were viewed one at a time at a viewing distance of approximately 12". The observers were asked to judge the overall visibility of each color sparse mark patch sample (FIG. 24) compared to the visibility of the standard ruler patches (FIGS. 23A-23D). That is, for each color sparse mark patch sample the observers were asked to identify the closest ruler patch either FIG. 23A, FIG. 23B, FIG. 23C or FIG. 23D. We assigned 3 equal steps between each of the ruler patches, so an observer could chose a direct match with a patch, closer to one patch vs. the next patch, equally in-between the one patch and the next patch, or closer to the next patch vs the one patch. The mean observer scores for the color sparse mark patch samples are plotted in FIG. 26A. The letters A, B, C and D along the vertical axis correspond with FIG. 23A, FIG. 23B, FIG. 23C and FIG. 23D, respectively. In general, the colors on the far right of FIG. 26A are lighter relative to the colors on the far left of the figure.

Please recall that two (2) of the twelve (12) PANTONE color samples in the subjective visibility testing were repeats. That is, sample BL was the same as EA, and sample ZN was the same as LY. Referring again to FIG. 26A, it can be seen that the subjective measurements of BL and EA, and of ZN and LY are very similar. The repeats proved to be another quality data point in our subjective testing. That is, the observers where consistent in their rankings of BL & EA, and ZN & LY.

Figure 26B:
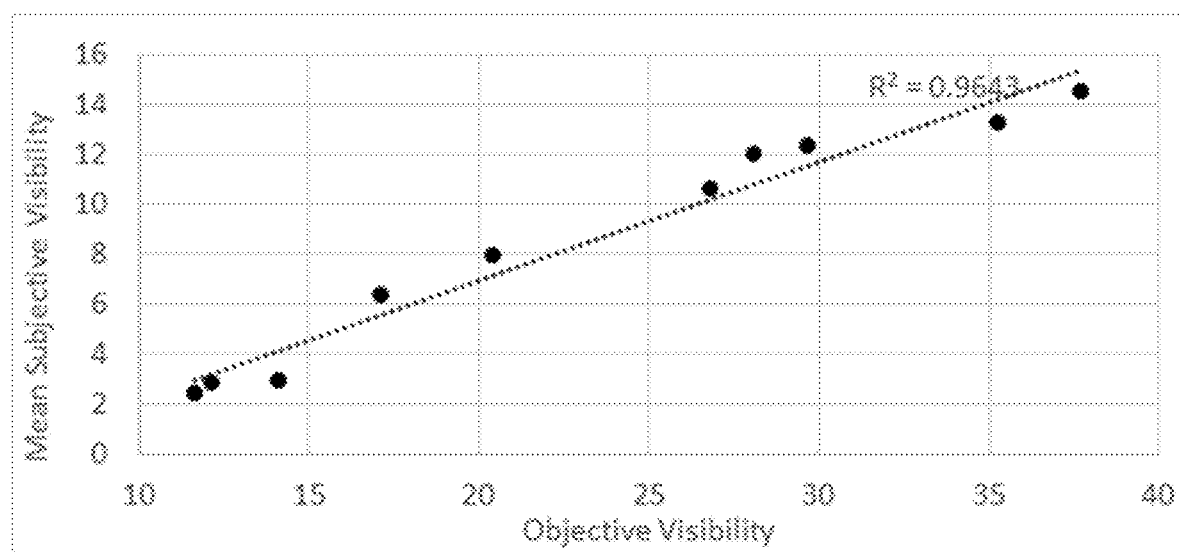
FIG. 26B show a correlation between the mean subjective visibility testing of FIG. 26A and an objective DB Score.

After removing the repeats, the correlation of the remaining ten (10) subjective visibility results to corresponding calculated DB Score as described above are shown in FIG. 26B. A large coefficient of determination ($r^2$=0.9643) was seen between the subjective mean and the objective visibility DB Score. While 12 observers is not a terribly large statistical sample set, it is instructive and illustrative of a close correlation of a DB Score and subjective testing.

The above methods and processes can be automated. For example, a design file is obtained for a particular package design. The file is unwrapped to discover which colors are included for the design. A DB Score can be determined for each of the colors in the file relative to the substrate or background color(s) indicated in the particular package design, with perhaps additional or substitute colors automatically suggested.

In another implementation, one where a design has flexibility, a most favorable color can be selected based on DB Scores. For example, if a blue is needed for the design, and design constraints are flexible, a blue color can be selected with a relatively higher DB Score in relation to other blues and the intended substrate, background or solid color area. This allows one color to be intentionally selected over another because of a higher DB Score or RPV value.

Now let's consider a different type of substrate altogether. Some retail items have a clear plastic substrate that cover or package what's inside (e.g., a package's "fill"). Two opposite examples of fill may include, e.g., a marshmallows (white) and black beans (black). The same clear plastic can result in a different reflectance for overprinted colors depending on the fill color. As a bit of background, various clear substrates used in flexographic printing have different opacity. And opaque white ink is often used as a "base ink" (or background ink) when printing on clear substrates. Other colors can be printed over the base ink to carry, e.g., an encoded signal or text, designs, etc. The opacity of the white base ink, however, may vary depending on the printing technique and ink's components. When a clear plastic substrate or substrate+opaque white are not entirely opaque, the reflectance at or around 660 nm (as well as other wavelengths) will depend on the color of the fill inside the package.

Figure 21A:
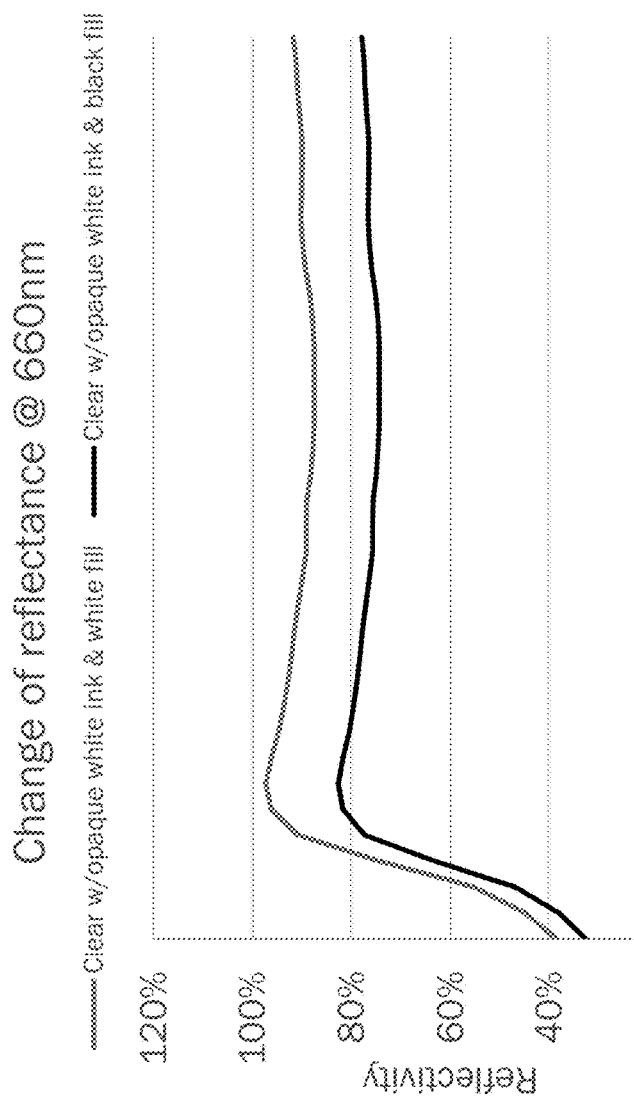
FIG. 21A is a graph showing reflectance differences for different product fill colors across a color spectrum.
Figure 21B:
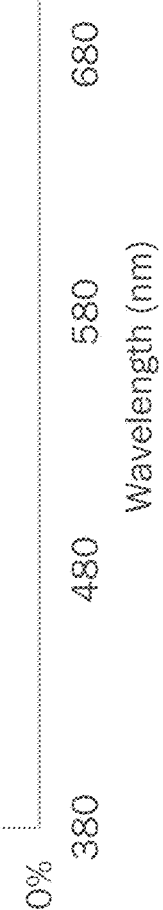
FIG. 21B shows two patches, one for a clear substrate with opaque white ink and white fill (left) and another for a clear substrate with opaque white ink and black fill (right).

For example, consider FIGS. 21A & 21B. The top curve in FIG. 21A represents reflectivity across wavelengths for clear plastic overprinted with opaque white ink and including a white fill (e.g., marshmallows). The bottom curve represents measurements of reflectivity across wavelengths for the same clear plastic overprinted with the same opaque white ink, but including a black fill (e.g., black beans). FIG. 21B shows a visual approximation of printed patches for clear plastic substrate with opaque white ink and a white fill (left box) and clear plastic substrate with opaque white ink and a black fill (right box).

If printing an encoded signal (e.g., a sparse mark in cyan ink) on a clear substrate having opaque white, the $\Delta 660$ nm will be impacted by both the opacity of the opaque white and the brightness of the fill or packaged material. Thus, to establish a reliable RPV or DB Score for overprinted clear substrates, both the fill and any substrate overprinting (e.g., opaque white) can be considered.

Figure 22A:
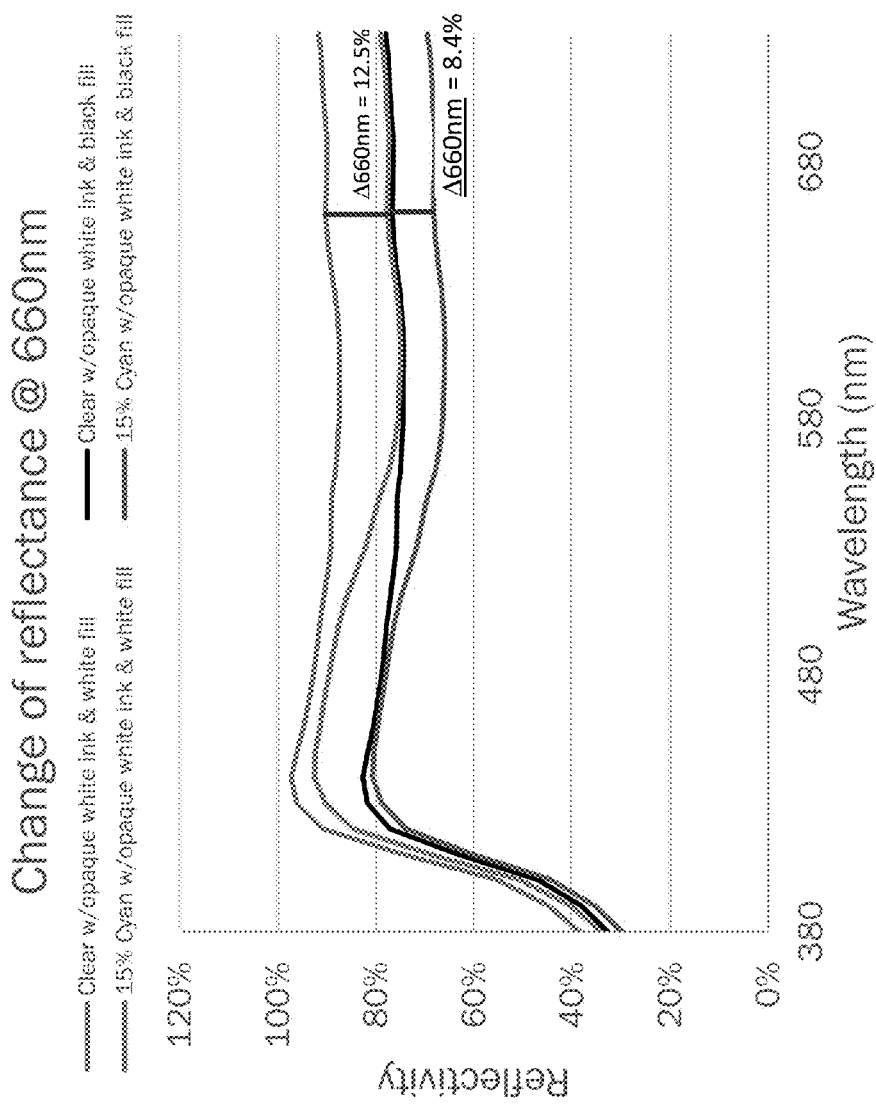
FIG. 22A is a graph showing reflectance differences for different product fill colors vs. Cyan across a color spectrum.

With reference to FIG. 22A, two $\Delta 660$'s are shown. The top value (12.5%) is a reflectance difference between: i) a layer including a clear substrate/overprinted opaque white ink/over a white fill and ii) Cyan printed at a 15% value over a layer including a clear substrate/overprinted opaque white ink/over a white fill. The bottom value (8.4%) is a reflectance difference between: i) a layer including the clear substrate/overprinted opaque white ink/over a black fill, and ii) Cyan printed at a 15% value over a layer including the clear substrate/overprinted opaque white ink/over the black fill.

Figure 22B:
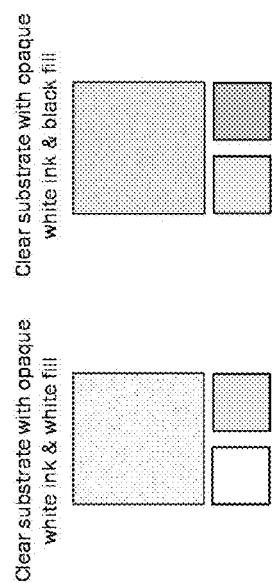
FIG. 22B shows two patches, one for a clear substrate with opaque white ink and white fill (left, with resulting colors for the white and cyan) and another for a clear substrate with opaque white ink and black fill (right, with resulting colors for the white and cyan).

To further illustrate this example, FIG. 22B approximates a printed clear plastic overprinted with opaque white ink, 15% Cyan and different fills. The left side of FIG. 22B represents the clear plastic, overprinted with opaque white ink and having a white fill. (On the left side, the bottom left box approximates the overprinted opaque white/clear plastic/white fill and the bottom right box approximate the 15% Cyan/overprinted opaque white/clear plastic/white fill.) The right side of FIG. 22B represents the clear plastic, overprinted with opaque white ink and having a black fill. (On the right side, the bottom left box approximates the overprinted opaque white/clear plastic/black fill and the bottom right box approximate the 15% Cyan/overprinted opaque white/clear plastic/black fill.) The Cyan and opaque white ink on the right side (black fill) appear relatively darker than the Cyan and opaque white ink on the left side (white fill).

A resulting difference in reflectance between the white fill and the black fill could impact an RPV or DB Score prediction, which could result in a less desirable encoded signal robustness outcome. (This could lead to choosing a color which yields a relatively larger $\Delta 660$ to insure that embedding will be seen by an image capture device at a machine-vision wavelength.) Substrates with lower opacity have a reduced encoded signal robustness and visibility. Thus, a reflectance difference attributable to a package's fill can be considered when determining robustness and visibility associated with an encoded signal.

As a partial summary, we can evaluate colors in terms of suitability to carry an encoded signal for any given substrate/background at a given image capture wavelength (e.g., a machine-vision wavelength such as found in a red LED scanner). We can use a metric (e.g., DB Score) to help evaluate robustness in terms of reflectance, encoded signal error and color error. This metric can be helpful in evaluating relative robustness vs. visibility for a color and substrate/background combination, at a given machine-vision wavelength. Other factors, e.g., reflectance differences due to a package's fill, can be considered when considering relative robustness and visibility.

Ink Trapping for Encoded Signals

Ink trapping includes a technique of printing one ink, e.g., a first spot color, on top of another ink, e.g., a second spot color. Said another way, ink trapping includes the overprinting and adhering of one ink over another ink to produce desired secondary or tertiary colors. For example, ink trapping may include the overprinting of CMY to produce various shades of Red (R), Green (G) and Blue (B), and/or the ink trapping of and with spot colors. (Ink trapping is different than so-called "image trapping," which involves compensating for printing plate registration variation, where two adjacent colors butting each other can be altered to allow for normal registration variances to exist without degrading a print design.) "Wet trapping" refers to ink that is being laid down on another ink that has not yet dried. "Dry trapping" involves an underlying ink that has already dried. One ink characteristic involved with ink trapping is so-called "ink tack". Ink tack can be defined as the "stickiness of an ink" or "adhesive" or "adhesion cling" and can be viewed in terms of relative ink tack, e.g., more adhesion to paper vs. an under or overprinted ink. Typically, high quality process printing requires good ink trapping of the ink colors with predictable ink trapping to attain the desired colors. As a result, the inks are wet trapped in descending order from highest tack down to lowest tack.

Our research led to a result of using ink trapping to help convey an encoded signal in an otherwise dark ink area. This technique doesn't require color screening of spot colors.

The process involves obtaining a spatial domain representation of an encoded signal, e.g., a sparse mark. The spatial domain representation of the sparse mark is used to guide printing of a first ink on a substrate. That is, the first ink is laid down on the substrate in a sparse mark pattern prior to printing of a second ink, e.g., the second ink being a relatively darker ink compared to the first ink. The second ink is then overprinted or flooded over the first ink and substrate. This results in areas including just the second ink over the substrates, and other areas including the second ink over the first ink which is over the substrate. In one embodiment, a darker ink has a relatively larger tack or adhesion with the substrate relative to its tack with the first ink. This results in less darker ink (in some cases no darker ink) in spatial areas on top of the first ink (see FIG. 18B) relative to spatial areas with no first ink. In the areas with the first ink, which represents an encoded signal element, less light is absorbed relative to the areas with just the darker ink. There is a resulting reflection difference between the overprinted first ink areas (more reflectance) and the darker ink only areas (less reflectance). Ink tack (or % tack) can be adjusted to provide a reflectance difference ($\Delta R$) between these two areas. We have found that sufficient reading can be had with a resulting $\Delta R$ in the range of 8%-60%. That is, a reflection of first areas comprising a layer of second ink/first ink/substrate is 8%-60% different than a reflection of second areas comprising a layer of second ink/substrate. More favorable results are had with a $\Delta R$ at or above 12%, e.g., 12%-20% or 12%-60+%. Although higher $\Delta R$ values can start to result in visibility concerns or higher color errors, a detector will likely see these higher values even more pronouncedly.

In the FIG. 18B example, we used Pantone 9520 C as the first printed ink, and Opaque Black as the darker ink (second ink). We found the reflectance of a white substrate alone at approximately 660 nm to be about 85%, the reflectance of Opaque black/9520/substrate areas to be about 62%, and the reflectance from an Opaque Black/substrate area to be about 3%. The $\Delta R$ between these areas is around 59%, which is a conservative robustness value for encoded signal detection. For example, this reflection difference between encoded signal elements and black areas can be readily distinguished by a reader analyzing captured image data at or around 660 nm. (We provide FIG. 18A as a contrast of overprinting opaque black with Pantone 9520 C. A more uniformly black area is a result, which would not yield the reflectance properties we seek.)

Consider a case where a sparse mark is first printed on a substrate with a first ink (e.g., Pantone 9520 C) and then flooded over by a darker color, a second ink (Opaque Black). A red LED scanner will effectively see a sea of black (attributable to the Opaque black/substrate areas) having lighter "holes" or reflective areas for a sparsely encoded signal (e.g., a sparse mark conveyed by the Opaque black/Pantone 9520 C/substrate areas). If a detector is configured to recognize darker areas as signal elements, a captured image can be inverted (light areas become darker, and darker areas become lighter) prior to decoding the encoded signal. Alternatively, and prior to printing an encoded signal, the encoded signal is inverted. The inverted signal is used as a pattern in printing. The printed pattern is then overprinted with a darker design ink meeting the above ink trapping conditions (e.g., in terms of achieving a readable $\Delta R$). The printed design is captured by a red LED scanner, but since the signal itself has already been inverted prior to printing, the encoded signal can be read directly from the scan data.

As discussed above in our ink selection section, we can optimize the selection of the sparse mark ink and the flood ink to achieve a desired robustness per unit visibility.

IV. Operating Environments

The components and operations of the various described embodiments can be implemented in modules. Notwithstanding any specific discussion of the embodiments set forth herein, the term "module" may refer to software, firmware and/or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. One such implementation is electronic circuitry that has been custom-designed and manufactured to perform some or all of the component acts, as an application specific integrated circuit (ASIC).

To realize such an implementation, some or all of the technology is first implemented using a general purpose computer, using software such as MatLab (from Mathworks, Inc.). For example, the RPV methods discussed above can be coded in Matlab, including a determination of RPW and RPC. A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes ink selection process, e.g., RPV/DB Score methods including a determination of RPW and RPC, operating on a specifically configured smartphone (e.g., iPhone 6 or Android device) or other mobile device, such phone or device. The smartphone or mobile device may be configured and controlled by software (e.g., an App or operating system) resident on the smartphone device. The resident software may include, e.g., a barcode decoder, digital watermark detector and detectability measure generator module.

Figure 19:
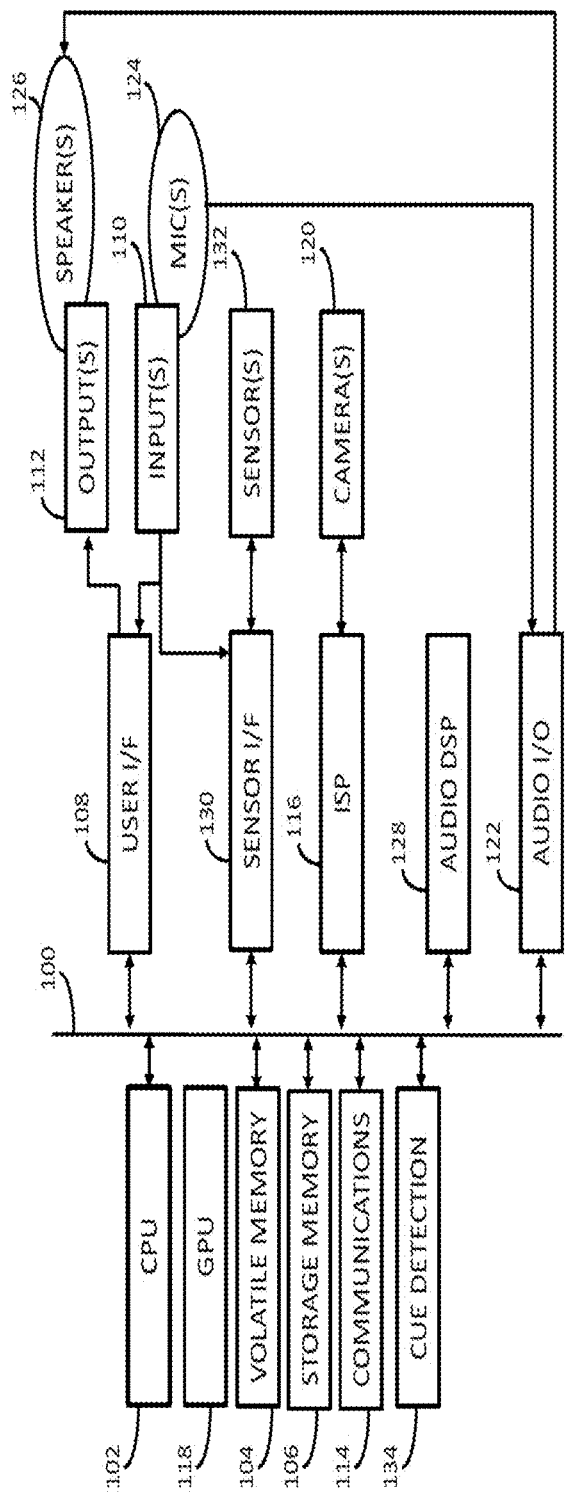
FIG. 19 illustrates an electronic device in which ink selection, encoding and decoding may be implemented.

For the sake of further illustration, FIG. 19 is a diagram of an electronic device (e.g., a smartphone, mobile device, tablet, laptop, or other electronic device) in which the components of the above encoder, decoder, and/or various ink or color selection embodiments may be implemented. It is not intended to be limiting, as the embodiments may be implemented in other device architectures or electronic circuitry.

Referring to FIG. 19, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 19 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A8 or A7. The A8 is built on a 64-bit architecture, includes a motion co-processor and is manufactured on a 20 nm process. The CPU 102 runs an operating system of the electronic device, runs application programs (e.g., mobile apps such as those available through application distribution platforms such as the Apple App Store, Google Play, etc., or custom designed to include watermark detection and object authentication) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. Watermark detection capabilities can be integrated into the operating system itself.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, an illumination source such as a flash or torch, a buzzer, a haptic actuator, a loud speaker, or the like or any combination thereof. In the case of an iPhone 6, the flash includes a True Tone flash including a dual-color or dual-temperature flash that has each color firing at varying intensities based on a scene to make sure colors and skin tone stay true.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's indigo press. An encoded object may include, e.g., a consumer packaged product, a label, a sticker, a logo, a driver's license, a passport or other identification document, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker. GPU 118 may also be configured to serve one or more functions of a watermark detector. In some cases GPU 118 searches for a watermark orientation component, while payload resolution is performed by the CPU 102.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensor(s) 132. Sensor 132 can, for example, include an accelerometer (e.g., for sensing acceleration, orientation, vibration, etc.), a magnetometer (e.g., for sensing the direction of a magnetic field), a gyroscope (e.g., for tracking rotation, orientation, or twist), a barometer (e.g., for sensing air pressure, from which relative elevation can be determined), a wind meter, a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 19, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such patent documents are incorporated in their entireties, including all drawings and appendices, even if cited above in connection with specific of their teachings. These documents disclose technologies and teachings that can be incorporated into the arrangements detailed, and into which the technologies and teachings detailed herein can be incorporated.

The particular combinations of elements and features in the above-detailed embodiments are exemplary only; the interchanging and substitution of these teachings with other teachings in this and the incorporated-by-reference patents are also contemplated.

Many combinations will be evident from the above disclosure.

What is claimed is:

1. A printed object comprising:
   a first substrate comprising a first area;
   a first color printed within the first area with a first ink, the first area comprising a plurality of spatial locations without the first ink;
   a second color printed within the first area and covering the plurality of spatial locations without the first ink, in which the second color is associated with the first color through an encoded signal error and a color error,
   in which the plurality of spatial locations without the first ink are arranged in pattern representing an encoded signal, and
   in which the first color and the second color comprise a spectral reflectance difference at a machine-vision wavelength in a range of 8%-70%.

2. The printed object of claim 1 in which the range comprises 12%-20%.

3. The printed object of claim 2 in which the first color comprises a reflectance which appears dark to a red LED scanner.

4. A product hang tag or packaging comprising the printed object of claim 2.

5. The printed object of claim 1 in which the spectral reflectance difference comprises 12% or higher.

6. The printed object of claim 5 in which the first color comprises a reflectance which appears dark to a red LED scanner.

7. The printed object of claim 6 in which the first color comprises a darker color relative to the second color.

8. A product hang tag or packaging comprising the printed object of claim 7.

9. The printed object of claim 1 in which the first color comprises a darker color relative to the second color.

10. A product hang tag or packaging comprising the printed object of claim 1.

11. A method comprising:
    obtaining data representing a color area;
    determining that the data representing the color area, or information obtained by using the data representing the color area, indicates that the color area comprises a reflectivity of fifteen (15) percent (%) or less at or around 660 nm;
    generating an encoded signal, the encoded signal comprising a pattern including signal elements at various spatial locations corresponding to the color area;
    generating holes in the color area according to the pattern, said generating holes yielding an encoded color area; and
    selecting a fill color for placement within the holes of the encoded color area, said selecting utilizing an encoded signal error that is associated with the color area, the fill color, and a reflectance difference at or around 660 nm between the color area and the fill color, said selecting also utilizing a color error that is associated with the color area, the fill color, and the reflectance difference.

12. The method of claim 11 further comprising applying the fill color to the holes within the encoded color area, said applying yielding a filled encoded color area.

13. The method of claim 12 further comprising controlling printing of an object including the filled encoded color area.

14. A retail package design produced by the method of claim 13.

15. A product hang tag design produced by the method of claim 13.

16. The method of claim 11 in which the encoded signal comprises a sparse mark.

17. An apparatus comprising:
means for storing data representing a color area;
means for determining that the data representing the color area, or information obtained by using the data representing the color area, indicates that the color area comprises a reflectivity of fifteen (15) percent (%) or less at or around 660 nm;
means for generating an encoded signal, the encoded signal comprising a pattern including signal elements at various spatial locations corresponding to the color area;
means for generating holes in the color area according to the pattern, said generating holes yield an encoded color area; and
means for selecting a fill color for placement within the holes of the encoded color area, said means for selecting utilizing an encoded signal error that is associated with the color area, the fill color, and a reflectance difference at or around 660 nm between the color area and the fill color, said means for selecting also utilizing a color error that is associated with the color area, the fill color, and the reflectance difference.

18. The apparatus of claim 17 further comprising means for applying the fill color to the holes within the encoded color area, said means for applying producing a filled encoded color area.

19. The apparatus of claim 17 in which the encoded signal comprises a sparse mark.

20. The apparatus of claim 18 further comprising means for controlling printing of an object including the filled encoded color area.

21. A non-transitory computer readable medium comprising instructions stored thereon that, when executed by one or more processors, cause said one or more processors to perform the following:
obtain data representing a color area;
determine that the data representing the color area, or information obtained by using the data representing the color area, indicates that the color area comprises a reflectivity of fifteen (15) percent (%) or less at or around 660 nm;
generate an encoded signal, the encoded signal comprising a pattern including signal elements at various spatial locations corresponding to the color area;
generate holes in the color area according to the pattern to yield an encoded color area; and
select a fill color for placement within the holes of the encoded color area utilizing an encoded signal error that is associated with the color area, the fill color, and a reflectance difference at or around 660 nm between the color area and the fill color, and also utilizing a color error that is associated with the color area, the fill color, and the reflectance difference.

* * * * *